(12) United States Patent
Rath

(10) Patent No.: US 12,267,219 B2
(45) Date of Patent: Apr. 1, 2025

(54) ASSIGNING SUPPORT TICKETS TO SUPPORT AGENTS

(71) Applicant: SupportLogic, Inc., San Jose, CA (US)

(72) Inventor: Poonam Rath, San Jose, CA (US)

(73) Assignee: SupportLogic, Inc., San Jose, CA (US)

( * ) Notice: Subject to any disclaimer, the term of this patent is extended or adjusted under 35 U.S.C. 154(b) by 107 days.

(21) Appl. No.: 16/906,412

(22) Filed: Jun. 19, 2020

(65) Prior Publication Data

US 2021/0014136 A1 Jan. 14, 2021

Related U.S. Application Data

(60) Provisional application No. 62/873,509, filed on Jul. 12, 2019.

(51) Int. Cl.
*H04L 41/5074* (2022.01)
*G06N 3/08* (2023.01)
(Continued)

(52) U.S. Cl.
CPC ........ *H04L 41/5074* (2013.01); *G06N 3/08* (2013.01); *G06Q 30/016* (2013.01); *H04L 41/5064* (2013.01); *H04L 41/5061* (2013.01)

(58) Field of Classification Search
CPC ............. H04L 41/5074; H04L 41/5064; H04L 41/5061; G06N 3/08; G06N 5/003;
(Continued)

(56) References Cited

U.S. PATENT DOCUMENTS 6,493,695 B1 * 12/2002 Pickering ............ H04M 3/5232
706/45
6,832,205 B1 12/2004 Aragones et al.
(Continued)

OTHER PUBLICATIONS

Authors et al., A System and Method to Automate Work Assignment and Evaluate Resource Contributions using a Ticket Complexity Scoring Mechanism, Jul. 22, 2013, IP.com, IPCOM000229318D (Year: 2013).*
(Continued)

*Primary Examiner* — Alex H. Tran
(74) *Attorney, Agent, or Firm* — Dergosits & Noah LLP; Todd A. Noah

(57) ABSTRACT

Assigning support tickets to support agents is described. A system receives support tickets and trains a machine-learning model to identify support agents who had experiences resolving support tickets of multiple complexities. The system receives a support ticket, identifies a topic of the support ticket, and estimates a complexity of the support ticket. The system identifies support agents who have skills handling the topic of the support ticket. The machine-learning model identifies support agents who have experiences resolving support tickets of the estimated complexity. The system projects workload availabilities, of identified support agents, for the support ticket. The system generates support agent scores based on the skills handling the topic, the experiences resolving support tickets of the estimated complexity, and the projected workload availabilities for the support ticket. The system assigns, based on the support agent scores, the support ticket to an identified support agent.

18 Claims, 4 Drawing Sheets

(51) Int. Cl.
*G06Q 30/016* (2023.01)
*H04L 41/5061* (2022.01)

(58) Field of Classification Search
CPC ........ G06N 7/005; G06N 20/10; G06N 20/20;
G06Q 30/016; G06Q 10/063112; G06Q
10/06311; G06F 16/24578
See application file for complete search history.

(56) References Cited

U.S. PATENT DOCUMENTS

| | | | |
|---|---|---|---|
| 9,000,934 B1 | 4/2015 | Gordin et al. | |
| 9,129,290 B2* | 9/2015 | Kannan | G06Q 10/067 |
| 9,473,637 B1 | 10/2016 | Venkatapathy et al. | |
| 9,678,817 B1 | 6/2017 | Hasbun Pacheco et al. | |
| 9,684,903 B2* | 6/2017 | Connolly | G06Q 30/016 |
| 10,171,666 B2* | 1/2019 | Mandel | G06Q 10/063112 |
| 10,380,516 B1* | 8/2019 | Kislaki | G06Q 10/063114 |
| 10,586,188 B2* | 3/2020 | Pandey | G06Q 10/063112 |
| 10,601,995 B2* | 3/2020 | Feast | G06Q 10/06395 |
| 10,735,590 B2* | 8/2020 | Prakash | H04M 3/085 |
| 11,222,290 B2* | 1/2022 | Singh | G06F 40/30 |
| 11,507,903 B2* | 11/2022 | Copeland | G06Q 10/105 |
| 11,509,770 B2* | 11/2022 | Ma | G06N 3/08 |
| 11,741,405 B2* | 8/2023 | Mujumdar | G06Q 10/20 705/7.14 |
| 2003/0046250 A1 | 3/2003 | Kuettner et al. | |
| 2010/0198635 A1 | 8/2010 | Pirtle et al. | |
| 2012/0023044 A1* | 1/2012 | Anerousis | G06N 5/043 706/46 |
| 2012/0143564 A1 | 6/2012 | Li et al. | |
| 2013/0268262 A1 | 10/2013 | Moilanen et al. | |
| 2014/0032254 A1* | 1/2014 | Della Corte | G06Q 10/06398 705/7.14 |
| 2014/0188457 A1 | 7/2014 | Fink et al. | |
| 2014/0245075 A1 | 8/2014 | Dhoolia et al. | |
| 2015/0254687 A1 | 9/2015 | Konopka et al. | |
| 2015/0254689 A1 | 9/2015 | Amemiya | |
| 2015/0278748 A1* | 10/2015 | Anderson | G06Q 30/016 705/7.14 |
| 2016/0098480 A1 | 4/2016 | Nowson | |
| 2017/0024680 A1* | 1/2017 | Allison | G06Q 30/016 |
| 2017/0242919 A1 | 8/2017 | Chandramouli et al. | |
| 2018/0060786 A1* | 3/2018 | Venkataraman | G06Q 30/016 |
| 2018/0131559 A1 | 5/2018 | Tapia et al. | |
| 2018/0211260 A1* | 7/2018 | Zhang | G06N 20/00 |
| 2018/0276061 A1 | 9/2018 | An et al. | |
| 2018/0278750 A1* | 9/2018 | Avila | H04L 51/02 |
| 2019/0102723 A1* | 4/2019 | Gupta | G06N 3/08 |
| 2019/0102746 A1* | 4/2019 | Gupta | G06Q 10/1095 |
| 2019/0130413 A1* | 5/2019 | Nelson | G06F 16/244 |
| 2019/0139054 A1* | 5/2019 | Mathrubootham | G06Q 30/016 |
| 2019/0197457 A1* | 6/2019 | Chan | G06Q 10/063112 |
| 2019/0213605 A1 | 7/2019 | Patel et al. | |
| 2020/0004434 A1 | 1/2020 | Borlick et al. | |
| 2020/0151648 A1* | 5/2020 | Gorny | G06F 40/20 |
| 2020/0394585 A1* | 12/2020 | McSwiggan | G06Q 30/016 |
| 2022/0222551 A1* | 7/2022 | Bezawada | G06N 5/043 |

OTHER PUBLICATIONS

Office Action dated Sep. 25, 2020, from related U.S. Appl. No. 16/352,692.

Office Action dated Mar. 1, 2021, from related U.S. Appl. No. 16/512,638.

\* cited by examiner

ASSIGNING SUPPORT TICKETS TO SUPPORT AGENTS

CROSS REFERENCE TO RELATED APPLICATION

This application claims priority under 35 U.S.C. § 119 or the Paris Convention from U.S. Provisional Patent Application No. 62/873,509, filed Jul. 12, 2019, the entire contents of which are incorporated herein by reference as if set forth in full herein.

BACKGROUND

A ticketing system (such as provided by Jira, GitHub, ServiceNow, Salesforce, Zendesk, or Freshdesk) generates tickets, which may be referred to as support tickets, service tickets, or cases, that track the communications between individuals, users, groups, teams, organizations, and businesses in spaces such as support, user service, sales, engineering and information technology. Although many of the following examples are described in the context of a ticketing system for a support space, embodiments of this disclosure apply equally to other ticketing systems for other spaces. In a support space example, a customer of a software product experiences a problem using the software product, activates a ticketing system, and submits a support ticket to the support organization which provides support for the software product. The support organization employs support agents who can receive the support ticket and respond to the customer, which maintains strong accountability standards and commands customer loyalty. Robust technical support for software products underlies a strong, sustained, and successful partnership between support organizations and their customers. In an ideal situation, a support agent accurately identifies, troubleshoots, and resolves a customer's problem in a timely manner, and closes the support ticket.

Support organizations that have many customers typically have difficulty prioritizing their relationships with their customers or invest heavily into closely evaluating those relationships. These support organizations need to understand the best way to focus finite resources to provide effective services and respond to support tickets in an intelligent manner, in contrast to taking a simple first-come-first-served approach. Many support organizations employ support teams whose sole purpose is to monitor the activity of support tickets, manage queues and assignments of support tickets, and proactively intervene when the resolutions of support tickets' problems are stalled. Such a potentially effective solution may become extremely costly and ultimately does not scale.

While at all times customers can rightfully expect prompt support, once customers accrue experience in submitting support tickets over a span of time and in seeing emerging and recurrent patterns of technical problems, these customers may develop a heightened expectation that support agents will bring adequate context and competence to every problem for swift resolution. Software products are often intricately tied with customer workflows and operations. Stabilizing this degree of customer dependence on a long-term basis requires a support organization to evolve and adapt to the customers' emerging and growing problems. One step towards this process is allocating the right personnel to respond to support tickets. If handled incorrectly, support tickets can remain unresolved for long periods of time and result in dissatisfied customers, with outcomes ranging from poor customer satisfaction scores to disengagement and churn.

The typical assignment process for support tickets is largely a manual process, and many support organizations follow either an active and decentralized approach or a passive and centralized approach. In an active and decentralized approach, support tickets are assigned to support agents on an alternating basis, or assigned to support agents by a queue manager based on the queue manager's perception of the support agents' knowledge of the support tickets' topics and the availability of the support agents. In a passive and centralized approach, all support agents can view the queue of open support tickets in a centralized repository, and then use their discretion to respond to support tickets as they choose. Other support organizations can use a hybrid system in which support agents can choose support tickets from a common queue, but a queue manager may step in to manually assign support tickets that linger unchosen in the queue.

DETAILED DESCRIPTION

Embodiments herein assign support tickets to support agents. A system receives support tickets and trains a machine-learning model to identify support agents who had experiences resolving support tickets of multiple complexities. The system receives a support ticket, identifies a topic of the support ticket, and estimates a complexity of the support ticket. The system identifies support agents who have skills handling the topic of the support ticket. The machine-learning model identifies support agents who have experiences resolving support tickets of the estimated complexity. The system projects workload availabilities, of identified support agents, for the support ticket. The system generates support agent scores based on the skills handling the topic, the experiences resolving support tickets of the estimated complexity, and the projected workload availabilities for the support ticket. The system assigns, based on the support agent scores, the support ticket to an identified support agent.

Figure 1:
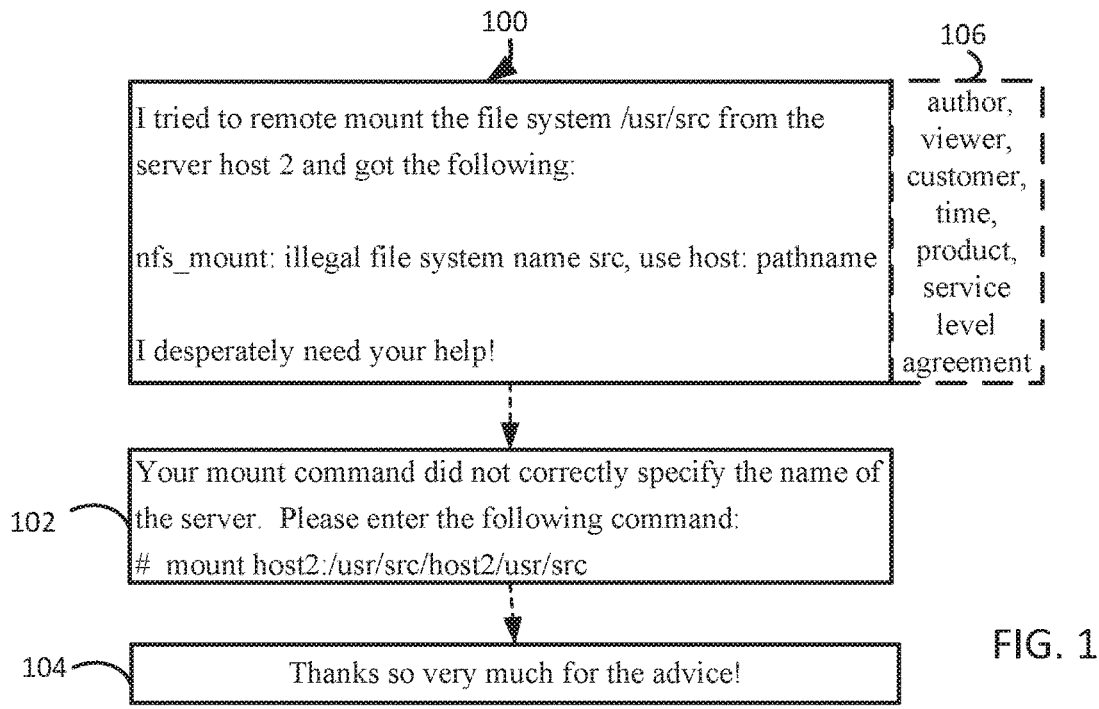
FIG. 1 illustrates a block diagram of example training data structures for assigning support tickets to support agents, under an embodiment.

For example, a system has a training server that receives a training set of closed support tickets, which includes the support ticket 100 that contains subsequent communications 102 and 104 and the support ticket's metadata 106, as depicted by FIG. 1. Then the training server trained some machine learning models to determine that a customer Ann submitted the support ticket 100, which contained a request for help with a remote mount problem and had a low complexity, and that support agents Bob and Dana had the skills to handle remote mount problems, had experiences resolving low complexity problems such as the remote mount problem, and had workloads that made them available to respond to Ann's support ticket. Then the machine learning models analyzed the support ticket's subsequent communications 102 and 104 to determine that Ann's support ticket was assigned to the support agent Bob, who recommended a solution for the remote mount problem, and that the customer Ann thanked Bob for the recommended solution.

Figure 2:
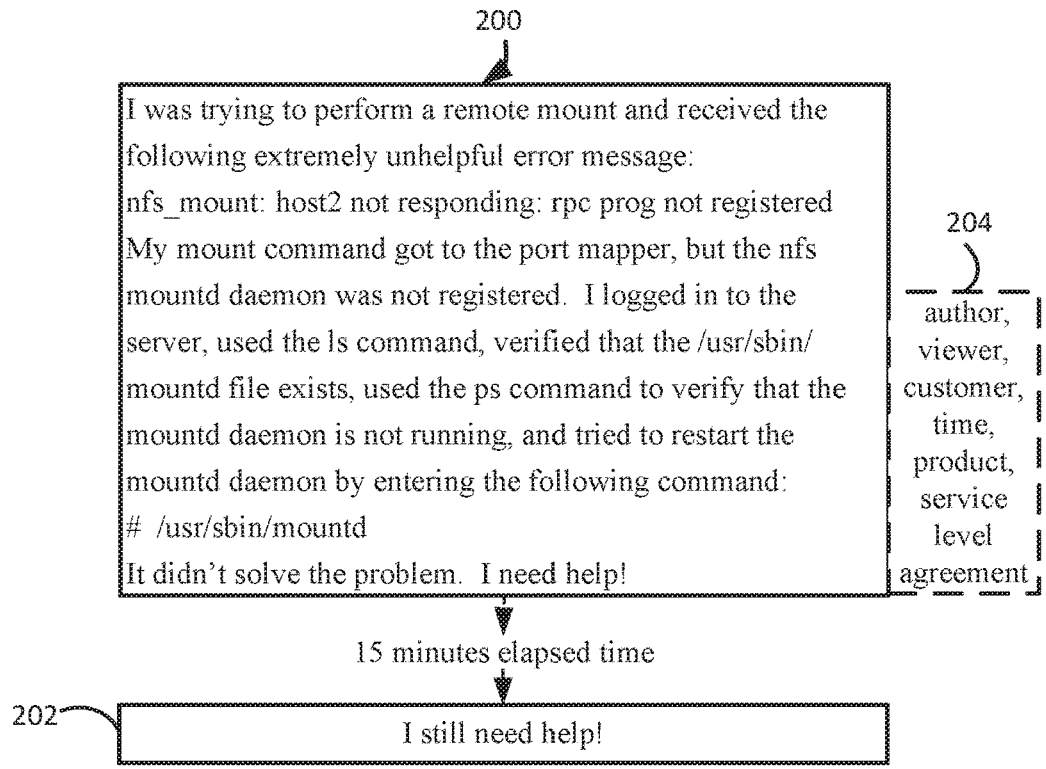
FIG. 2 illustrates a block diagram of example production data structures for assigning support tickets to support agents, under an embodiment.

The system also has a production server that receives support tickets, which includes the support ticket 200 that contains the subsequent communication 202 and the support ticket's metadata 204, as depicted by FIG. 2. The trained machine learning models determine that a customer Chris is submitting the support ticket 200, which includes a request for help with a remote mount problem and has a high complexity due to the inclusion of multiple machine language error messages. Then the trained machine learning models determine that support agents Bob and Dana have the skills to handle remote mount problems, and have the workloads that make them available to respond to Chris' support ticket, but only Dana has experience resolving high complexity problems, Consequently, the production server calculates a higher assignment score for Dana, and assigns Chris' support ticket to Dana, because Dana is the only available support agent with experience resolving high complexity problems, such as the remote mount problem that generated multiple machine language error messages. The machine learning system assigns support tickets to appropriate support agents suited to the task at hand. After support tickets are assigned to support agents, the support ticket progresses, and the support agents' workloads change, the frequently executing machine learning system can update its assignments by reassigning some support tickets to other support agents and/or recommend that subject matter experts from the support organization collaborate on various support tickets, thereby troubleshooting effectively in a context-specific manner.

Figure 3:
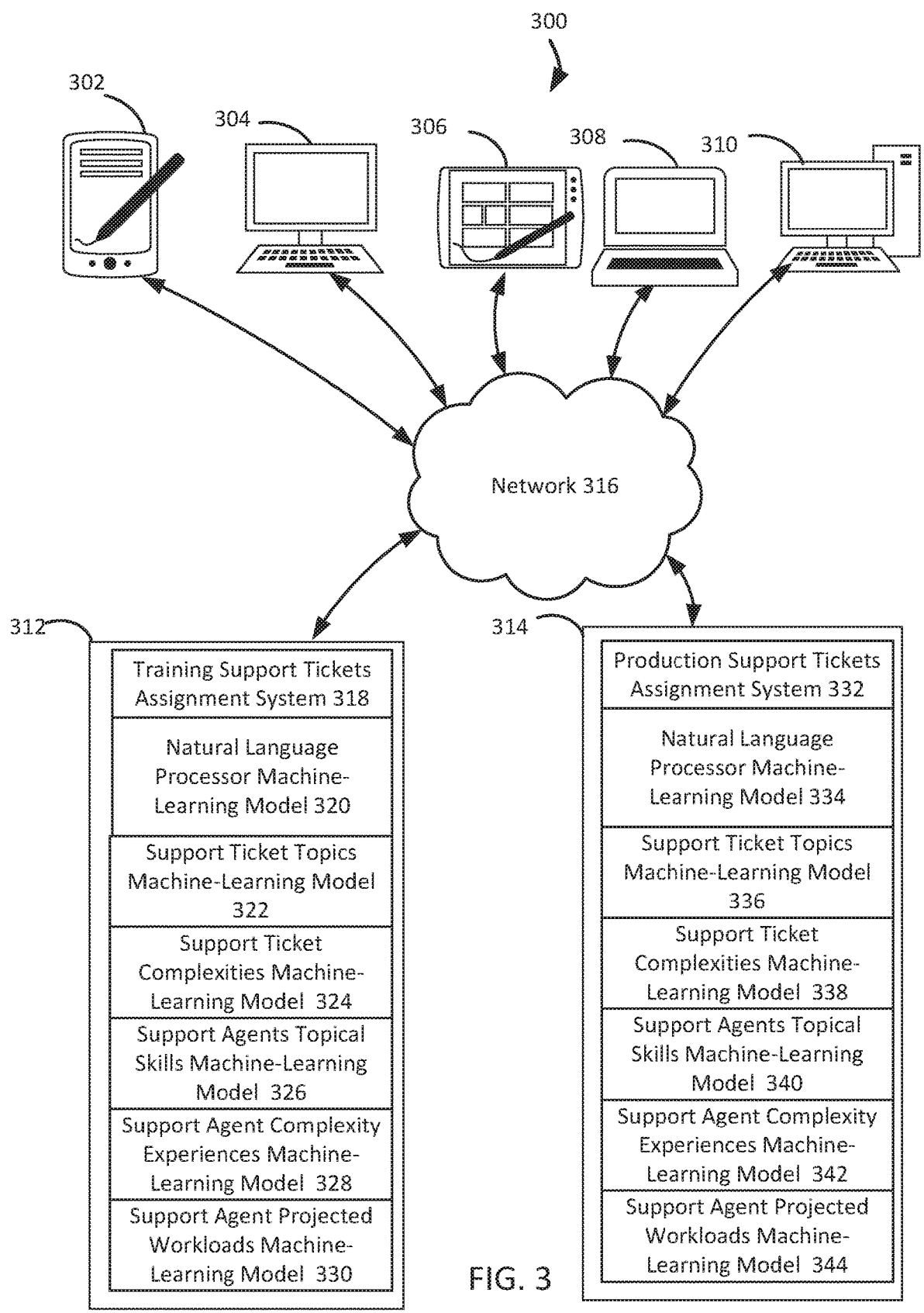
FIG. 3 illustrates a block diagram of an example system for assigning support tickets to support agents, under an embodiment.

FIG. 3 illustrates a block diagram of an example system 300 for assigning support tickets to support agents, under an embodiment. As shown in FIG. 3, the system 300 may illustrate a cloud computing environment in which data, applications, services, and other resources are stored and delivered through shared data centers and appear as a single point of access for the customers. The system 300 may also represent any other type of distributed computer network environment in which servers control the storage and distribution of resources and services for different client users. In an embodiment, the system 300 represents a cloud computing system that includes a first client 302, a second client 304, a third client 306, a fourth client 308, a fifth client 310; and a first server 312 and a second server 314 that may be provided by a hosting company. The clients 302-310 and the servers 312-314 communicate via a network 316. The first server 312 may be referred to as the training server 312, and the second server 314 may be referred to as the production server 314.

The training server 312 may include a training support tickets assignment system 318, which may include a natural language processor machine-learning model 320, a support ticket topics machine-learning model 322, a support ticket complexities machine-learning model 324, a support agent topical skills machine-learning model 326, a support agent complexity experiences machine-learning model 328, and a support agent projected workloads machine-learning model 330. The production server 314 may include a production support tickets assignment system 332, which may include a natural language processor machine-learning model 334, a support ticket topics machine-learning model 336, a support ticket complexities machine-learning model 338, a support agent topical skills machine-learning model 340, a support agent complexity experiences machine-learning model 342, and a support agent projected workloads machine-learning model 344. In some embodiments, the natural language processor machine-learning model 320, the support ticket topics machine-learning model 322, the support ticket complexities machine-learning model 324, the support agent topical skills machine-learning model 326, the support agent complexity experiences machine-learning model 328, and the support agent projected workloads machine-learning model 330 may be combined into one training machine-learning model. Similarly, in some embodiments the natural language processor machine-learning model 334, the support ticket topics machine-learning model 336, the support ticket complexities machine-learning model 338, the support agent topical skills machine-learning model 340, the support agent complexity experiences machine-learning model 342, and the support agent projected workloads machine-learning model 344 may be combined into one production machine-learning model.

Even though FIG. 3 depicts the first client 302 as a smartphone 302, the second client 304 as a terminal 304, the third client 306 as a tablet computer 306, the fourth client 308 as a laptop computer 308, the fifth client 310 as a personal computer 310, and the servers 312-314 as servers 312-314, each of the system components 302-314 may be any type of computer system. The system elements 302-314 may each be substantially similar to the hardware device 500 depicted in FIG. 5 and described below. FIG. 3 depicts the system 300 with five clients 302-310, two servers 312-314, one network 316, two support tickets assignment systems 318 and 332, six training machine-learning models 320-330, and six production machine-learning models 334-344. However, the system 300 may include any number of clients 302-310, any number of servers 312-314, any number of networks 316, any number of support tickets assignment systems 318 and 332, any number of training machine-learning models 320-330, and any number of production machine-learning models 334-344.

In some embodiments, any combination of the production machine-learning models 334-344 may be replaced by production elements 334-344 that provide some of the functionalities of the production machine-learning models 334-344, and the combination of the training machine-learning models 320-330 that corresponds to the replaced production machine-learning models 334-344 may be deleted. For example, in some embodiments the support ticket topics machine-learning model 336 may be replaced by a support ticket topics identifier 336, the support ticket complexities machine-learning model 338 may be replaced by a support ticket complexities identifier 338, and the support agent topical skills machine-learning model 340 may be replaced by a support agent topical skills identifier 340. Continuing the example, in some embodiments, the support agent complexity experiences machine-learning model 342 may be replaced by a support agent complexity experiences identifier 342, and/or the support agent projected workloads machine-learning model 344 may be replaced by a support agent projected workloads identifier 344.

Although FIG. 3 depicts all of the training elements 318-330 residing completely on the training server 312, any or all of the training elements 318-330 may reside completely on the production server 314, or in any combination of partially on the training server 312, partially on the production server 314, partially on the clients 302-310, such as by residing as data management applications on the clients 302-310, and partially on another server which is not depicted in FIG. 3. While FIG. 3 depicts all of the production elements 332-344 residing completely on the production server 314, any or all of the production elements 332-344 may reside completely on the training server 312, or in any combination of partially on the production server 314, partially on the training server 312, partially on the clients 302-310, such as by residing as data management applications on the clients 302-310, and partially on another server which is not depicted in FIG. 3. After training to assign support tickets to support agents, the system 300 may be referred to as the trained system 300.

The training support tickets assignment system 318 can train the natural language processor machine-learning model 320 to provide analysis of a training set of closed support tickets, and may use this analysis to assist in determining which of these closed support tickets may have been assigned to specific support agents. The training support tickets assignment system 318 optionally trains the support ticket topics machine-learning model 322, the support ticket complexities machine-learning model 324, the support agent topical skills machine-learning model 326, the support agent complexity experiences machine-learning model 328, and the support agent projected workloads machine-learning model 330 to use this analysis to determine which closed support tickets may have been assigned to specific support agents. A machine-learning model can be an application of artificial intelligence that provides a system with the ability to automatically learn and improve from experience without being explicitly programmed. A support ticket can be a request logged on a work tracking system detailing a problem that needs to be addressed. A closed support ticket can be a previous request that had been logged on a work tracking system detailing a problem that needed to be addressed. A support agent can be a person who is responsible for providing an act of assistance.

After sufficient training, the system 300 can deploy the natural language processor machine-learning model 320, the support ticket topics machine-learning model 322, the support ticket complexities machine-learning model 324, the support agent topical skills machine-learning model 326, the support agent complexity experiences machine-learning model 328, and the support agent projected workloads machine-learning model 330. These components 320-330 may be deployed as the natural language processor machine-learning model 334, the support ticket topics machine-learning model 336, the support ticket complexities machine-learning model 338, the support agent topical skills machine-learning model 340, the support agent complexity experiences machine-learning model 342, and the support agent projected workloads machine-learning model 344, respectively.

Then the production support tickets assignment system 332 can use the natural language processor machine-learning model 334 to provide real-time analysis of support tickets and their subsequent communications. The production support tickets assignment system 332 may apply the support ticket topics machine-learning model 336, the support ticket complexities machine-learning model 338, the support agent topical skills machine-learning model 340, the support agent complexity experiences machine-learning model 342, and the support agent projected workloads machine-learning model 344 to the real-time analysis to determine which support tickets are assigned to support agents who have the skills, experiences, and projected workload availabilities to respond appropriately to the support tickets. If any support ticket's circumstances change sufficiently, the frequently-executing production support tickets assignment system 332 can use the machine-learning models 334-344 to reassign the support ticket to another support agent who has the skill, experience, and projected workload availability to respond appropriately to the support ticket's changed circumstances. By executing at frequent intervals, the production support tickets assignment system 332 may ensure that the support tickets' assignments continue to accurately reflect any substantial changes in the support tickets' circumstances. As a support ticket progresses, the production support tickets assignment system 332 can recommend that other support agents and subject matter experts in the support organization collaborate on responding to the support ticket effectively in a context-specific manner.

The support tickets assignment systems 318 and 332 may extract information about a support ticket from a variety of sources, such as support ticket metadata, support ticket comments, prior support ticket histories for each customer, and support ticket histories for each support agent, and then determine support agent compatibility for the support ticket based on the support agents' prior performances on similar support tickets, where similarity is determined on multiple distinct factors. The support tickets assignment systems 318 and 332 can take into account various aspects of a support ticket, identify support agents' skills in handling the topic(s) of the support ticket, and identify support agents' experiences with the support ticket's complexity, support agents' experiences with the individual customer, support agents' experiences with the customer's company, support agents' workloads, and support agents' availabilities to identify the optimal support agents for responding to the support ticket.

The support tickets assignment systems 318 and 332 may expose an interface to accept input data points for scoring individual support tickets. Such a query-able interface can include, but is not limited to, a Representational State Transfer (REST) Application Programming Interface (API), a Python API, a web API, or a web user interface. The support tickets assignment systems 318 and 332 may be queried typically both at the outset of a support ticket, and at a specified frequency, such as every two hours, to get an updated view of the support ticket, such as the support ticket's current age and urgency. The support tickets assignment systems 318 and 332 may be queried in an event-based manner when a support agent takes ownership of a support ticket, as such ownership changes the support agent's projected workload availability, which may be considered when assigning any remaining support tickets.

Further, support ticket reassignment can occur when individual support tickets are being worked by support agents 24 hours per day/7 days a week, such that a support ticket may be passed from one group of time-zones to another group of time-zones. Such reassignment may result in a support ticket being placed in an unassigned queue for the next group of time zones when the active group of time zones reaches the end of their business day. The support tickets assignment systems 318 and 332 can execute at each transition points between groups of time zones to identify the appropriate support agents in the next group of time zones to receive the reassignment of a support ticket. For example, at 5:00 P.M. in the Pacific time zone of the four North American time zones, the production support tickets assignment systems 332 executes during a transition point and reassigns a support ticket from a support agent working in San Francisco to a support agent working at 8:00 A. M. in the time zone in China.

In some support environments, level 1 (L1) support agents may provide initial support ticket triage, and work with a customer to find additional information about the support ticket's problem. A simple support tickets assignment model may be used for the initial support tickets' assignments to L1 support agents, or these initial assignments may be simply performed on an alternating basis. The L1 support agents may resolve a problem themselves if the problem may be easily resolved. Otherwise, the support tickets assignment systems 318 and 332 can reassign support tickets that have higher complexities or require more skills to level 2 (L2) support agents or level 3 (L3) support agents. In addition, the support tickets assignment systems 318 and 332 may be queried at regular intervals to evaluate support tickets that are currently assigned to support agents and to suggest individuals who can collaborate or assist on the support tickets based on the individuals' prior experience in contributing to the resolution of similar support tickets.

When a customer opens a support ticket and uses natural language to describe the issue they are having with a product, product feature, or product use case, the servers 312 and/or 314 can receive the support ticket and use the natural language processor machine-learning models 320 and/or 334 to analyze the received support ticket. The servers 312 and/or 314 may extract information from a given support ticket to gauge the degree of support and expertise it requires, by taking into consideration metadata such as company information, customer information, initial support ticket priority, support ticket age, and the customer's time zone. Then the support ticket topics machine-learning models 322 and/or 336 can use this analysis to determine a support ticket's topic and identify the topic's subtopics, which may be the product which is causing the problem and/or the problem itself, without requiring intimate knowledge of the nature of those products and product features. Therefore, the support ticket topics machine-learning models 322 and/or 336 determining which product is experiencing the problem described in a support ticket can enable a support organization to identify which support agents have the required skills to handle the problem and required experience with the estimated complexity to resolve the problem, and can consequently provide a sufficient quality of service without a significant investment in resources. For example, after receiving the training set of closed support tickets which include the support ticket 100, the training server 312 trains the support ticket topics machine-learning model 322 to use the natural language processor machine-learning model 320 to analyze the support ticket 100 and identify a remote mount problem as the topic of the support ticket 100. In another example, after receiving the open support ticket 200, the production server 314 applies the support ticket topics machine-learning model 336 to the analysis of the support ticket 200 by the natural language processor machine-learning model 334, and identifies a remote mount problem as the topic of the support ticket 200. A topic can be an issue, a natter, a subject, or a theme that is dealt with in a text.

The support ticket topics machine-learning models 322 and/or 336 can identify a support ticket's topic(s) by using a support ticket-topic matrix created by the training server 312. The support ticket-topic matrix may be a mathematical construct in which support tickets are rows and topics are columns, and which may contain topics extracted from a representative range of support tickets collected from a specified time frame, such as the past six months, to maintain both recency and relevance to current topic trends. There are multiple ways for the training server 312 to construct the support ticket-topic matrix, such as using a predefined list of topics that are recorded as metadata for a support ticket. Metadata can be a set of information that describes other information.

Additionally, the support ticket topics machine-learning models 322 and/or 336 may identify new topics that are pertinent to a support ticket as the support ticket progresses through the back-and-forth communication between a support agent and a customer. In such support tickets, the metadata set at the outset of a support ticket may not identify the new topics. To accurately model this phenomenon, the support ticket topics machine-learning models 322 and/or 336 can extract topics from a support ticket by computing term frequency corresponding to each topic within the support ticket, normalized by the inverse document frequency for each topic across all support tickets, and by computing the percentage of comments within a support ticket in which the topics appear. For example, if the natural language processor machine-learning model 320 identifies the term "remote mount" as 9.5% of the words that the customer Ann entered for the support ticket 100, and also as a term in 0.1% of all support tickets, then the natural language processor machine-learning model 320 uses this 95-fold increase in the actual term frequency relative to the expected term frequency to identify the term "remote mount" as a topic of the support ticket 100. Additionally, the support ticket topics machine-learning models 322 and/or 336 can use the natural language processor machine-learning models 320 and/or 334 and other classic named entity recognition techniques to extract topics, and can use available ontologies to help detect topics that are important to specific customers.

Further, the servers 312 and/or 314 can execute this process separately on the human-generated text and machine-generated text which an automated text processing subsystem extracted from the body of a support ticket and comments on the support ticket. The servers 312 and/or 314 may also consider the directionality of comments, applying different weights to topics extracted from comments by a user and comments by a support agent. A body can be the main or central part of a text. A comment can be a written remark expressing an opinion or reaction.

The servers 312 and/or 314 can analyze prior support ticket history through a variety of methods including, but are not limited to, inferring topic hierarchy. Certain keywords might be distinctive and specific to a narrow subset of technical problems, while others might be more broadly applicable to a wide variety of problems. The servers 312 and/or 314 can infer topic hierarchy using a combination of unsupervised machine learning techniques such as hierarchical clustering with co-occurrence as a proxy for similarity. In addition, through the use of natural language processing techniques like named entity recognition and topic modeling, the servers 312 and/or 314 may establish specific problems within a topic.

The servers 312 and/or 314 can use terms surrounding a topic to establish a range of problems related to a product, such as installation, upgrade, production issues, or administrative related problems, and even feature requests. This distinction is important to make because subsets of problems might require targeted expertise. In this way a repository can describe all possible problems associated with a product and a given support ticket may be mapped to a specific combination of problems within this repository.

The servers 312 and/or 314 can use different weights for topics with respect to support ticket progression to distill relevant topics, because the topics extracted during the later stages of a support ticket may be more relevant to the support ticket than the topics extracted during the earlier stages of the support ticket, Additionally, the servers 312 and/or 314 may use the changes in the frequency with which topics are mentioned in a support ticket to help focus on the correct topics. Finally, the servers 312 and/or 314 can also evaluate the topics extracted from support ticket notes written by the support agent or other members of the support organization (for troubleshooting and support ticket tracking purposes) that are invisible to the customer. The servers 312 and/or 314 can additionally evaluate the support ticket summary written at the end of a support ticket by a support agent, when such a summary is available. A note can be a brief record of facts, topics, or thoughts. A summary can be a brief statement or account of the main points of something.

Certain types of support tickets can take longer to resolve than other support tickets because of these types of support tickets' complexities, and such complex support tickets are more likely to be successfully resolved when assigned to a support agent equipped with the right skills and experience in resolving similar support tickets in their recent past. Before assigning a support ticket to a support agent, the support tickets assignment system 318 and/or 332 may determine the support ticket's complexity by applying the support ticket complexities machine-learning models 324 and/or 338 to the analysis of the received support ticket by the natural language processor machine-learning models 320 and/or 334. This analysis may leverage features derived before the assignment of a support ticket, such as text-based features extracted from the support ticket body, the initial priority of the support ticket, and the identity and the history of the customer who submitted the support ticket. Examples of customer history include the historical product problems that a customer has experienced, historical sentiments expressed by a customer, historical perceived quality of support received, historical support ticket resolution time, the history of the individuals who interact with the support agents, and the historical statuses of a customer's historical support tickets.

A complexity can be a situation that requires a level of specialized knowledge to be understood. An initial priority can be a beginning condition of an entity being regarded as more important than another entity. A customer identity can be the role of a person or organization that buys goods or services. A customer history can be a record of past events related to a person or organization that buys goods or services.

For example, if the production support tickets assignment system 332 has determined that a customer is waiting for a support agent to respond and detects another communication from the customer without detecting a response from the support agent, the production support tickets assignment system 332 increases the support ticket's complexity even further as the customer grows increasingly impatient. This increase in estimated complexity may ensure that the production support tickets assignment system 332 reassigns the support ticket to a support agent who has the experience to respond to the support ticket's increased complexity if the currently assigned support agent lacks this experience. In another example, the support ticket complexities machine-learning model 338 receives identification of a customer, references the customer's subscription to a high-level support package, and increases the estimated complexity for the customer's support ticket. This increase in estimated complexity may ensure that the production support tickets assignment system 332 assigns the support ticket to a support agent who has the experience to respond to the support ticket's increased complexity within the response time specified in the customer's high-level support package. In yet another example, a customer is experiencing a significantly large number of problems with a product relative to the historical number of problems that the customer previously experienced with the product, and the support ticket complexities machine-learning model 338 responds to this significantly large number of problems by estimating a very high complexity for the customer's support ticket. This very high complexity may result in the production support tickets assignment system 332 assigning the support ticket to the support organization's management, which reviews the previous support tickets for the product and contacts the customer to ensure that the customer is still satisfied with the product and the support that the customer is receiving.

The support ticket complexities machine-learning models 324 and/or 338 can predict multiple aspects of a support ticket's complexity, such as the support ticket's resolution time, the fraction of the support ticket's text that will record technical comments, and the number of subject matter experts needed. The support ticket complexities machine-learning models 324 and/or 338 may also predict a more straightforward categorization of complexities, such as L1, L2 and L3, where L1 represents low complexity support tickets and L3 represents high complexity support tickets. In this case, the servers 312 and/or 314 can construct a support ticket-complexity matrix that consists of support tickets as rows and the support tickets' complexities as columns When submitting support tickets, customers may often express the complexity of the problem they are facing in order to convey that information to the support organization. The natural language processor machine-learning models 320 and/or 334 can assist in estimating a support ticket's complexity from a customer's natural language that details the support ticket's problem in a manner that is accurate and reliable for the support organization to act upon. By enabling and encouraging customers to express their problems in natural language terms that reflect the complexity, a support organization may be better equipped to respond accordingly. For example, the training server 312 trains the support ticket complexities machine-learning model 324 to use the natural language analysis of the support ticket 100 by the natural language processor machine-learning model 320 to estimate a low complexity from a customer's description of their remote mount problem.

In another example, the production server 314 applies the support ticket complexities machine-learning model 338 to the natural language analysis of the support ticket 200 by the natural language processor machine-learning model 334, to estimate a high complexity from a customer's description of their remote mount problem because the support ticket 200 includes multiple machine language error messages. During training, the support ticket complexities machine-learning model 324 learned that support tickets for remote mount problems were subsequently resolved as low complexity problems unless the support tickets included multiple machine language error messages, in which case the remote mount problems were subsequently resolved as high complexity problems. Consequently, when the support ticket complexities machine-learning model 324 was deployed as the support ticket complexities machine-learning model 338, the support ticket complexities machine-learning model 338 retained this learning about support tickets that describe remote mount problems and include multiple machine language error messages.

Sometimes the complexity of a support ticket may be asymmetric with the skills required for handling the topic of the support ticket. For example, the customer Chris opens the support ticket 200, writes in natural language about the remote mount problem, and includes multiple machine language error messages. The support ticket complexities machine-learning model 338 and the support ticket topics machine-learning model 340 may use the natural language analysis of the natural language processor machine-learning model 334 to determine that a support agent is required to have few skills to handle the simple topic of a remote mount problem, but must have experience resolving support tickets that have a high complexity because the support ticket includes multiple machine language error messages.

The servers 312 and/or 314 can extract information about support agents that qualify for the given support ticket in one or more aspects. Such information can include the support agent's skills in handling support tickets with topics relevant to the current support ticket and support tickets of similar complexity, the support agent's experience with the specific customer who submitted the current support ticket, the support agent's availability in terms of time zone, work hours and paid time off, and the support agent's current workload. Therefore, the training server 312 may create a support agent-topical skills matrix. In addition to capturing the topics extracted for each closed support ticket, the support ticket-topical skills matrix captures information about the corresponding support agent. The training server 312 can weigh each support ticket's topic(s) for every support agent by the factors specific to each support ticket, as well as the context in which each support ticket was handled, so as to provide an estimate of every support agent's performances handling their support tickets Standalone support ticket-specific factors that capture a support agent's performance include, but are not limited to, the support ticket resolution time, the sentiment score, and the escalation status of the support ticket. The weights may be normalized for each customer (such as the median support ticket resolution time for support tickets by the same customer) because every customer can have their own baseline and distinct preferences for higher or lower sentiment. A resolution time can be a chronological measure of the action of solving a problem. A sentiment score can be a measure of a view of or attitude toward a situation or event. An escalation status can be the condition of an increased level of support.

Context specific factors include, but are not limited to, the support agent's ticket backlog and the support agent's workload at the time a support ticket was assigned to the support agent. The training server 312 can enable the weights of these factors to be changed as per end-user preferences, and can enable the weights to be altered such that they are higher weights for more recent support tickets and lower weights for older support tickets. A support agent ticket backlog can be an accumulation of requests logged on a work tracking system detailing a problem that needs to be addressed and which is yet to be completed by a person who is responsible for providing an act of assistance. A support agent workload can be the amount of assistance to be provided by a person who is responsible for providing acts of assistance.

The training server 312 can weigh the topics, and then aggregate all support tickets for each support agent, thereby creating one summary row for each support agent, which captures each support agent's overall skills, both in terms of volume or quantity and in terms of support quality, in handling support tickets that have certain product-related topics, which are the columns in the matrix. To determine a support agent skill match, the servers 312 and/or 314 can extract the support agent skill summary vector for each support agent from the support agent-skills matrix and rescale the support agent skill summary vector by the relatedness of the topics previously handled to the topic(s) identified in the current support ticket. This rescaling may serve to highlight any experience that a support agent had with the current support ticket's topic(s) and closely related topics, while downplaying the experience the support agent had with unrelated topics. Then the servers 312 and/or 314 can aggregate topics across the support agent skill summary vector to generate a skill score that represents the level of matching between a support agent's skill in handling topics and the current support ticket's topic(s). Although the summary rows in the support agent-topical skills matrix are described as capturing a support agent's skills for handling each topic that is a column in the matrix, the summary rows may also be described as capturing a support agent's experiences for resolving each topic that is a column in the matrix.

For example, after identifying the topic of the closed support ticket 100 was a remote mount problem, the training server 312 trained the support agent topical skills machine-learning model 326 to use the summary rows for the support agents in the support agent-topical skills matrix to identify Bob and Dana as support agents who had skills handling a remote mount problem. In another example, after identifying the topic of the open support ticket 200 is a remote mount problem, the production server 314 applies the support agent topical skills machine-learning model 340 to the summary rows for the support agents in the support agent-topical skills matrix to identify Bob and Dana as support agents who have skills handling a remote mount problem.

Similarly, the training server 312 can create a support agent-complexity experiences matrix. In addition to capturing the complexities estimated for each closed support ticket, the support ticket-complexity experiences matrix can capture information about the corresponding support agent. The training server 312 may weigh each support ticket's complexity for every support agent by the factors specific to each support ticket, as well as the context in which each support ticket was resolved, so as to provide an estimate of every support agent's performances on their support tickets. Standalone support ticket-specific factors that capture the support agent's performance include, but are not limited to, the support ticket resolution time, the sentiment score, and the escalation status of the support ticket. The weights may be normalized for each customer (such as the median support ticket resolution time for support tickets by the same customer) because every customer can have their own baseline and distinct preferences for higher or lower sentiment.

Context specific factors include, but are not limited to, the support agent's ticket backlog and the support agent's workload at the time a support ticket was assigned to the support agent. The training server 312 can enable the weights of these factors to be changed as per end-user preferences, and can enable the weights to be altered such that they are higher weights for more recent support tickets and lower weights for older support tickets. The training server 312 may weigh the complexities of the support tickets, and then aggregates all support tickets for each support agent, thereby creating one summary row for each support agent, which can capture each support agent's overall experience, both in terms of volume or quantity and in terms of support quality, in resolving support tickets that have certain complexities, which are the columns in the matrix. A support agent-complexity experience vector may contain the distribution of complex support tickets that a support agent has resolved in the past. The servers 312 and/or 314 can reorder this list based on the complexity estimation of the current support ticket. Although the summary rows in the support agent-complexity experiences matrix are described as capturing a support agent's skills for resolving each complexity that is a column in the matrix, the summary rows may also be described as capturing a support agent's skills for handling each complexity that is a column in the matrix.

For example, after identifying the low complexity of the remote mount problem in the closed support ticket 100, the training server 312 trained the support agent complexity experiences machine-learning model 326 to use the summary rows for the support agents in the support agent-complexity experiences matrix to identify Bob and Dana as support agents who had experiences resolving support tickets that had a low complexity. In another example, after estimating the high complexity of the remote mount problem in the open support ticket 200, the production server 314 applied the support agent complexity experiences machine-learning model 340 to the summary rows for the support agents in the support agent-complexity experiences matrix to identify only Dana as a support agent who has experiences resolving support tickets that have a high complexity.

The training server 312 can compute a specialist score for a given support agent by using the diversity in the range of topics handled by the support agent with respect to the support agent's total historical support ticket volume. The topic diversity itself may factor in the number of unique topics as well as each topic's similarity to the other topics. A high specialist score may indicate that a support agent is an expert on account of the support agent's in-depth experience on a few but closely related topics, while a low specialist score may indicate that a support agent has worked on a variety of loosely related topics and is more of a generalist Surfacing a specialist score for each support agent may allow an end user in the query-able interface to make subjective choices for certain open support tickets as required.

In addition to a weighted skills/experiences summary for support agents, the training server 312 can capture the breadth and depth of support agents' expertise, and patterns in the support agents' prior experiences that might indicate close partnerships with certain customers and/or customers' companies. A customer may build a preferred partnership with a support agent over time. In some cases, there are designated engineers or other support personnel that may serve as gatekeepers for all support tickets opened by a specific customer. The training server 312 can use these patterns in the support ticket recommendation process itself or can surface such patterns as additional information provided to end users. The training server 312 can also capture aggregate support ticket volume that each support agent has (recently) handled across each customer or each company. The servers 312 and/or 314 may model customer affinity by weighting support agents with extensive experience handling support tickets in the past for the current customer, while taking into account customer satisfaction with their performance.

The production server 314 can create a support agent-workload data structure to reflect that support agents with multiple support tickets in their backlog will be impacted in their ability to give all of their attention to another new support ticket, even if their skills make them suitable for the new support ticket. Therefore, the production server 314 can compute the projected workloads of those support agents who have been shortlisted for a given open support ticket, based on the support agents' skills and experiences. Besides the total number of support tickets currently assigned to each support agent, the training server 312 can consider other aspects of the support tickets in a typical backlog, including but not limited to the priority distribution, the escalation status, the probability of escalation predicted by an escalation prediction system, the support ticket complexity, and the support ticket life-stage, which can range from being newly opened to being resolved pending closure. The training server 312 can compute a support agent's projected workload by down-weighting support tickets that are already resolved and pending closure as closed and by up-weighting those support tickets that are predicted to have a high escalation probability by the escalation prediction system or are already escalated. A projected workload can be an estimated amount of assistance to be provided by a person.

For example, after identifying Bob and Dana as support agents who had skills for handling the remote mount problem in the closed support ticket 100 and experiences resolving support tickets that had a low complexity, the training server 312 trained the support ticket projected workloads machine-learning model 328 to use the support agent-workload data structure to identify Bob and Dana as support agents who had projected workloads that would have permitted resolving support tickets that had a low complexity. In another example, after identifying Bob and Dana as support agents who have skills for handling the remote mount problem in the open support ticket 200 and only Dana as a support agent who has experiences resolving support tickets that have a high complexity, the production server 312 applies the support ticket projected workloads machine-learning model 342 to the support agent-workload data structure to identify Dana as a support agent who has a projected workload that permits resolving support tickets that have a high complexity. In some embodiments, the production server 312 applies the support ticket projected workloads machine-learning model 342 to the support agent-workload data structure to identify Bob as a support agent who has a projected workload that permits resolving support tickets that have a high complexity, even though Bob has no experience resolving support tickets that have a high complexity, because Bob mat be the only support agent who is available.

A total number can be a whole amount of a set of entities. A priority can be a condition of an entity being regarded as more important than another entity. A predicted probability of escalation can be an estimated likelihood of a request to increase a level of support. A support ticket life-stage can be a work phase of a request logged on a work tracking system detailing a problem that needs to be addressed.

The production server 314 can create and maintain a support agent-availability data structure to identify support agents who have projected availabilities for being assigned a support ticket. A support agent might be a good match for a customer's support ticket based on their skills and experiences, and yet not be the correct match if there is no time zone compatibility with that of the customer. Even if the support agent's time zone is compatible with that of the customer, the support agent might be unavailable while on vacation, or unable to work on a support ticket through to its completion if the support agent has a time off schedule which includes a vacation that begins soon. Finally, a support agent's time zone might match that of a customer who submitted a support ticket, but this matching of time zones might provide little value outside of work hours. A projected availability can be the future condition of a person being able to provide assistance.

When a customer needs "around the clock" support, the support agent who is assigned the support ticket after the customer's standard work hours should ideally be in a time zone where the support agent's active work hours are synchronized with the time after the customer's standard work hours. For example, at 5:00 P.M. in the Pacific time zone of the four North American time zones, the production support tickets assignment systems 332 assigns a support ticket from a customer in San Francisco to a support agent working at 8:00 A.M. in the time zone in China. To account for the above scenarios, the production server 314 can create and maintain the support agent-availability data structure which incorporates the support agent time zone, active work hours, and time off schedule. The production server 314 may derive the active work hours of a support agent from the support agent's time zone or by analyzing the distribution of the times of the support agent's response which are recorded in historical support tickets. The production server 314 can extract a support agent's time off information from the support agent's work calendaring or human resources systems, such as Google Calendar and Workday.

For example, after identifying Bob and Dana as support agents who had projected workloads that would have permitted resolving a support ticket that had a low complexity, the training server 312 referenced the support agent-availability data structure to verify that Bob and Dana would have had projected availabilities to be assigned the closed support ticket 100, such that Bob and Dana would have had the projected workload availability for accepting assignment of the closed support ticket 100. In another example, after identifying Bob and Dana as support agents who have projected workloads that permit resolving a support ticket that has a high complexity, the production server 314 references the support agent-availability data structure to verify that Bob and Dana will have projected availabilities to be assigned the open support ticket 200, such that Bob and Dana both have the projected workload availability for accepting assignment of the open support ticket 200. In some embodiments, the production server 314 would not reference the support agent-availability data structure to verify that Bob will have the projected availability to be assigned the open support ticket 200 because Bob has no experience resolving high complexity support tickets such as the high complexity support ticket 200.

A time zone compatibility can be a state in which two things are able to exist or occur in chronologically based divisions of the world without problems. A time off schedule can be plans for days away from work. Active work hours can be parts of a day when occupational tasks occur. A projected workload availability can be the condition of a person being able to provide an estimated amount of assistance.

The production server 314 may receive a support ticket for which there is no historical customer or product data, which typically poses a cold-start challenge, meaning that there is no prior pattern that may be used to directly derive a match between the support agent and the customer or the product. For new customers, for whom there is no support agent-customer experience in the historical data, the production server 314 can analyze the topic(s) and complexity of the current support ticket, and perform a match based on skills handling the identified topic(s) and the experiences resolving the estimated complexity, without matching on customer experience. As a proxy for customer experience, the production server 314 may use other factors that identify similar customers, such as other customers with a level of support similar to what the new customers have subscribed or a size similar to the customer's contract, and find support agents who are experienced in handling support tickets for similar customers. For new product for which few or no support tickets have been resolved previously, the production server 314 can identify similar products in historical data, such as the previous versions of the product, and use support agents' skill and experiences with those similar products as a proxy for support agents' skills and experiences with the new product.

The servers 312 and/or 314 can take each of the factors described above into consideration in an unweighted manner to generate a final support agent score, but an end user can also re-weigh these factors in accordance with their preferences. The servers 312 and/or 314 can compute a composite score based on a support ticket's topic(s) and estimated complexity, and a support agent's skills, experiences, workload availability, and customer affinity, and assign the support ticket to the support agent with the highest score, reordering as required based on support agent time zone compatibility with that of the customer. Further, the weights associated with each factor in scoring support agents vis-a-vis a support ticket may be surfaced and may be altered through the query-able interface to update scores and re-order the list of support agents for a support ticket. Since each of the factors that go into computing a support agent's score may be visible to the end user, the support agent can identify and comment upon the factors that they agree or disagree with. Feedback collected from the support agents on whether or not they are satisfied with the assignments based on the breakdown of factors can then be used to retrain the machine-learning models that can capture additional features that were missed or under-valued in the previous iteration of the system.

In general, the production support tickets assignment system 332 may exhibit a tendency to assign support tickets to support agents who have more skills handling support tickets' topics and more experiences resolving support tickets' complexities. Therefore, the production support tickets assignment system 332 may assign support tickets deemed to be low risk, due to requiring low skills to handle the topic, low complexities, and/or low priorities indicated by support tickets' metadata, to less skilled and/or less experienced support agents, which enables the less skilled and/or less experienced support agents to learn more on the job and increase their skills and experiences, The production server 314 may set up an initial process of capturing the skills of completely new support agents who have no historical data. If a support agent is a newly recruited expert in certain fields, then the production server 314 can initialize a skill vector for this support agents and perform matches based on their skills. The production server 314 can mark support tickets with their priority, so that low complexity and/or low priority support tickets can be assigned to support agents with little experience in order to raise these support agent's experience levels.

Therefore, assigning a support ticket to a support agent may include assigning or reassigning a support ticket to a support agent who has less skills for handling a topic of a support ticket, less experience with resolving the complexity of the support ticket, and/or less projected workload availability for a support ticket, instead of to a support agent who has more skills for handling the topic of the support ticket, more experience with resolving the complexity of the support ticket, and more projected workload availability for the support ticket. The servers 312 and 314 may generate support agent scores based on support agents' skills handling a support ticket's topic, support agents' experiences resolving the support ticket's complexity, support agents' workloads, and support agents' availabilities, and then use the support agent scores to assign the support ticket to a support agent. For example, the training support tickets assignment system 318 generated a score of 90 for assigning the closed support ticket 100 to Bob. This score of 90 is based on Bob having skills handling the remote mount problem of the closed support ticket 100, experiences resolving low complexity support tickets such as the closed support ticket 100, a workload that would have permitted resolving a low complexity support ticket, and the availability to be assigned the closed support ticket 100. In another example, the training support tickets assignment system 318 generated a score of 100 for assigning the closed support ticket 100 to Dana. This score of 100 is based on Dana having skills handling the remote mount problem of the closed support ticket 100, experiences resolving the low, medium, and high complexities of all support tickets, a workload that would have permitted resolving the low complexity closed support ticket 100, and the availability to be assigned the closed support ticket 100.

Although Dana's score of 100 is higher than Bob's score of 90, the training support tickets assignment system 318 assigned the closed support ticket 100 to Bob because the closed support ticket 100 was a low risk support ticket due to the few skills required to handle a remote mount problem and the experiences resolving low complexity support tickets such as the closed support ticket. Therefore, the training support tickets assignment system 318 assigned the low risk close support ticket 100 to the inexperienced support agent Bob who was sufficiently qualified to be assigned the low risk support ticket 100, while leaving Dana's workload free to handle higher risk support tickets for which Dana would have been qualified but Bob would not have been qualified. A support agent score can be a calculated measure of the suitability for a person who is responsible for providing an act of assistance to be assigned a request logged on a work tracking system detailing a problem that needs to be addressed.

In yet another example, the production support tickets assignment system 332 generates a score of 45 for assigning the open support ticket 200 to Bob. This score of 45 is based on Bob having skills handling the remote mount problem of the open support ticket 200, no experiences resolving high complexity support tickets such as the open support ticket 200, a workload that would have permitted resolving a high complexity support ticket, and the availability to be assigned the open support ticket 200. In a further example, the production support tickets assignment system 332 generates a score of 90 for assigning the open support ticket 200 to Dana. This score of 90 is based on Dana having skills handling the remote mount problem of the open support ticket 200, experiences resolving high complexity support tickets such as the open support ticket 200, a workload that would have permitted resolving the high complexity support ticket 200, and the availability to be assigned the open support ticket 200. Since Dana's score of 90 is higher than Bob's score of 45, the production support tickets assignment system 332 assigns the open support ticket 200 to Dana because Dana is the only support agent who is sufficiently qualified to resolve the high complexity support ticket 200 since Dana has the experiences which Bob lacks resolving high complexity support tickets such as the open support ticket 200.

Support tickets do not necessarily follow a predefined cadence or frequency in the way they are submitted. Accordingly, the production server 314 may operate on a continuous stream of support tickets, with corresponding shifts in support agent workloads and their availabilities. The production server 314 can ensure optimal workloads for support agents so that support agents have the capacity to take on new support tickets that might be relatively more critical that the support tickets that the support agents are currently handling. The production server 314 can ensure that the most strategic customers (such as customers with the largest revenue, newest accounts, or accounts close to renewal) are helped by the most experienced and competent support agents.

The production support tickets assignment system 332 can achieve optimal workload for a highly skilled and experienced support agent by reassigning, on an as-needed basis, the lower priority support tickets that the expert support agent currently has in their queue. The production server 314 can determine the priority of a support ticket by the support ticket's urgency or by the life stage of the support ticket, such as whether the central issue been resolved. If a series of complex support tickets are received and are assigned to an expert support agent, the expert support agent's workload might become full quickly. However, when critical support tickets are received, the production support tickets assignment system 332 can reassign some of the complex support tickets in the expert support agent's current queue to other support agents. This reassignment may be useful because during the period of support ticket ownership, the expert support agent should have worked the complex support tickets towards resolution, on account of being adept in handling similar complex support tickets in the past.

On the other hand, there may be a cost associated with reassigning any support ticket before resolution. An obvious cost is a loss of context, since the newly assigned support agent may not begin working right where the previous support agent left off, especially if the support ticket is complex and a significant troubleshooting has already occurred. If the new support agent is not aware of the context, then the new support agent may ask redundant questions, which would lead to delays in support ticket resolution. The production server 314 may reduce this cost by providing a summary of the previous support agent's handling of a support ticket to the new support agent, along with resolution path statistics of similar s support tickets in the past. Besides reassigning support tickets when new, critical support tickets displace the workload of a support agent, the production support tickets assignment system 332 can perform support ticket reassignment by taking into account a "follow the sun" model. When the work hours of a current support agent end, the production support tickets assignment system 332 can reassign the current support agent's support tickets to o a new support agent whose active hours follow the active work hours of the previous support agent. For example, at 5:00 P.M. in the Pacific time zone of the four North American time zones, the production support tickets assignment systems 332 reassigns a support ticket from a support agent working in San Francisco to a support agent working at 8:00 A. M. in the time zone in China The production support tickets assignment system 332 can manage optimal support agent workload by maintaining workload slack, such that every support agent has a certain percentage of free capacity at all times. Consequently, the production support tickets assignment system 332 may not simply assign support tickets to an expert support agent based on the expert support agent's skills and experiences until the expert support agent's workload is full. The production support tickets assignment system 332 can determine the relative importance of a customer while the customer's support ticket is still unassigned. If an expert support agent has extensive experience handling support tickets for the customer (or the customer's company), and there are no current support tickets by the customer, then the production support tickets assignment system 332 can leave the expert support agent's workload only partially full, to accommodate future support tickets by their niche customer. By executing periodically, the production support tickets assignment system 332 can identify the support tickets associated with the key customers and assign these support tickets to the expert support agents before the availability of these expert support agents is reduced by the assignment of other support tickets.

Since workload management is not a static process, the production support tickets assignment system 332 can fill each support agent's workload to a different capacity, which may be based on factors including, but not limited to, customer and product life cycle information. For example, if a customer submits support tickets only at designated intervals, then around the anticipated time of the customer submitting a support ticket, the production support tickets assignment system 332 can follow the customer's support ticket submission cycle by maintaining an emptier workload for the support agent who is an expert and the preferred point of contact for this customer. In addition, ticketing trends might be more stable long after a product is integrated with the customer's workflows, and rather unpredictable when a product is new or has been experiencing emerging problems. The production support tickets assignment system 332 can determine the relative importance of incoming support tickets based on other factors and can assign certain support tickets to less skilled and/or less experienced support agents, as described above.

The workload management process of leaving a support agent's workload only partially full can create costs from not assigning a support ticket to the support agent, especially when the support agent is a subject matter expert for the support ticket. One cost is that a support ticket may be incorrectly handled by an alternative support agent to whom the support ticket is diverted, especially if the alternative support agent is less skilled and/or less experienced, such that the progress of the support ticket might be slower. This cost of slow progress may be especially true if no critical support tickets come in as anticipated, in which case the expert support agent might have already resolved the now diverted and slow progressing support ticket. The production server 314 may reduce this cost by allowing transparency into support ticket progress and visibility into a list of who the more skilled and/or more experienced support agents are for the current support tickets. This way, an expert support agent can be aware of support tickets that are assigned to other support agents who are less skilled and/or less experienced, such that the expert support agent may be able to provide guidance for a support ticket via a "mentoring queue," without being directly assigned to the support ticket. The less skilled and/or less experienced support agent can view expert support agents who have handled similar support tickets in the past by viewing an "expert queue" and contacting the expert support agents when required.

Seamless support ticket resolution may involve not just an initial assignment of an incoming support ticket, but also the monitoring of a support ticket's progress, and ensuring efficient collaboration among support personnel, which may be referred to as support ticket swarming. The production server 314 can uses natural language processing to analyze the technical content, such as stack traces or error messages, that is shared during the course of a support ticket, typically as support ticket comments. The production server 314 can surface successfully resolved support tickets from the past that had similar technical content, along with information about the support agents and other support personnel who collaborated on or were assigned such support tickets, as well as the trajectory of those support tickets until resolution.

The production server 314 can also use support ticket comments to track information about support organization personnel who collaborated on similar support tickets in the past. Such information tracking may be especially relevant for senior support personnel who are not assigned support tickets because they are typically managers or senior engineers, who use support ticket notes to provide guidance to a support agent who has been assigned a support ticket. In addition to surfacing past collaborators on support tickets, the production server 314 may construct pods that consist of clusters of subject matter experts or customer relationship-centered experts who tend to collaborate on support tickets. Such a grouping of experts into pods can provide advance notice to all the support personnel within the pod when a specific support ticket is opened, so that they can be prepared ahead of time to intercede and guide the resolution of the support ticket.

The natural language processor machine-learning models 320 and/or 334 may provide an efficient user experience by enabling humans to communicate in the modes in which they are naturally most comfortable—that of conventional language. A consequence of the breadth and ease with which humans communicate with one another in natural language is that inferring meaning from a support ticket's content may be challenging. Therefore, the natural language processor machine-learning models 320 and/or 334 rely on a multitude of advanced natural language processing techniques, some of which fall under the domain of machine learning model techniques. The primary input when determining the topics, problems, and complexity of a support ticket may be the content of the support ticket. Although the natural language processor machine-learning models 320 and/or 334 are oriented to mining information from text content, a well-performing voice-to-text application could render the natural language processor machine-learning models 320 and/or 334 as useful for voice calls as well.

The training server 312 may train the natural language processor machine-learning model 320 to infer tags, labels, or classifiers that may be used to summarize and/or describe the content of input language. This natural language processor machine-learning model 320 may be trained as an attentional machine learning model to learn not just the weights of the input words and phrases in how they pertain to a classifier, but also which words and phrases are most relevant to predictions of a classifier given the structure of the input words and phrases. The qualifier "attentional" derives from the notion that this technique is, broadly speaking, similar to the manner in which humans choose what to pay attention to when focusing on a task. A customer who is experiencing a catastrophic computer system failure may give far greater weight to the computer system than to the clouds in the sky outside or the carpet in the room.

Similarly, an attentional model can give far greater weight to the input that it deems most relevant to the task at the expense of other inputs.

This attentional model technique may represent a stark contrast to bag of words models in which all weights for an input have equal importance, and which discards the structure of the input. A bag of words model may be a natural language processing technique used for classifying natural language text, such as assigning a classification of positive or negative to a movie review based on the positive and negative words in the review's natural language text. Bag of words models may be trained to learn tokens, which are particular words or small phrases, and learn weights for the tokens, which are associated with classes or classifiers. Continuing with the movie review example, since the token bad is in more negative reviews than positive reviews, a bag of words model learns a negative weight for the token bad. Although bag of words models may be reasonably accurate when classifying long documents, these models produce noisy results for small input sizes, such as sentence- or phrase-level texts, because of the small number of tokens available for weighting. Even classifying long documents may be problematic when dealing with technical support communications which often includes both human-generated natural language text and machine-generated text which is not in a natural language.

Attentional predictions may be made using a combination of general language models used to infer the syntax (structure and/or organization) of input language and task-specific models used to provide weight to language within the inferred structure. There may be several key outcomes of inferring the syntax of language in order to make predictions, in particular determining the role, such as parts of speech, of individual words, as well as the relationship of words and phrases to one another. Using combinations of tagged parts of speech and word or phrasal relationships may enable advanced behaviors such as determining whether a word or phrase in particular is being negated, expressed in a conditional or hypothetical manner, or expressed in a specific tense or mood. These advanced behaviors may greatly increase the accuracy of text classification on short documents which cause great challenges for conventional methods.

The simplest way in which predictions may be influenced by syntactic features is the suppression of key phrases that are negated. Conceptually this negation is straightforward in the example, "This is not a high priority issue." However, in practice the natural language processor machine-learning model 334 is reliant on a general language model that can achieve high accuracy using a technique called dependency parsing, in which direct, binary relationships are established between words in a sentence. For example, in the sentence "This is a small problem," the word "small" is directly related to the word "problem," the word "This" is directly related to the word "is," the word "is" is directly related to the word "a," and the word "a" is indirectly related to both the word "problem" and to the word "This." The dependency chain may be followed to conclude that the word "This" is also indirectly related to the word "problem." Applying the same technique to the more complex example, "This is not a small problem, it is a disaster," determines that the word "it" is indirectly related to the word "disaster," the word "not" is indirectly related to the word "problem," and very importantly that the word "not" is not related to the word "disaster." This attentional model technique may provide much more accurate information as to the content of this text than a technique that would simply detect the presence of negative tokens such as "not" and negate any and all predictions pertaining to that text. Returning to the support context, this same attentional model technique can excel where other models do not, such as in the following example "This is a high priority issue and your response is not helpful."

Modifying predictions of classifiers for words or phrases that occur within a conditional or hypothetical context may be crucial for suppressing would-be problems or outcomes that people naturally and frequently express. For example, technical support customers frequently express concern about problems that may not have actually happened, such as, "If this system had gone down, we would have had a major catastrophe on our hands." Since the customer narrowly avoided a major catastrophe, the support ticket may be assigned to a support agent with experience in resolving lower complexity support tickets in a far less urgent manner than a higher complexity support ticket from a customer who was in the midst of an ongoing catastrophe. Using language-aware techniques may enable the natural language processor machine-learning model 334 to suppress language of this type from being surfaced up to or even being sent directly to an inbox of a support organization's upper management. The language-aware techniques may result in increased accuracy of the natural language processor machine-learning model 334, and greater confidence by support organizations that the production support tickets assignment system 332 assigns a support agent with sufficient experience to a support ticket. In contrast, a bag of words approach that searches for conditional terms such as would, could, and should, can only identify a small portion of expressions of the subjunctive mood and would unnecessarily suppress predictions when a conditional term is unrelated to the key aspects of the language being evaluated, such as "We have a major catastrophe on our hands—we would appreciate a response immediately!"

The natural language processor machine-learning models 320 and/or 334 can use a dedicated machine learning classifier to identify log messages and various categories of machine text on the basis of statistical differences between human text and machine text. Using statistical as well as natural language processing-based methods to extract such pieces of information from the support ticket can enable the natural language processor machine-learning models 320 and/or 334 to focus on processing natural language without being distracted by machine text.

The production support tickets assignment system 332 can determine a support ticket's complexity and/or topic automatically and in near-real-time through automated analysis of support tickets. The production support tickets assignment system 332 can generate a support ticket's updated complexity and/or topic when a new support ticket event occurs and/or at periodic time intervals to capture the increasing time elapsed since the most recent support ticket communication.

Training the training support tickets assignment system 318 can include enabling end users to make corrections or otherwise label the estimated complexities and/or identified topics as being accurate or not, and then providing a new value the end users perceive to be the accurate score for that scenario. The training support tickets assignment system 318 can feed such these labels into the machine-learning models 322-330, which identify the support ticket events, complexities, topics, and/or workload availabilities at the time of the label. Then the training support tickets assignment system 318 can learn a representation of the internal mathematical operations as outlined above, such as by using decision trees, random forests, simple vector machines, Bayesian methods, gradient boosted classifiers, k-nearest neighbor classifiers, neural networks, support vector machines, naive Bayes classifiers, logistic regression models, and other machine learning techniques. After the training support tickets assignment system 318 completes the training of the natural language processor machine learning model 320 and the machine-learning models 322-330, the production support tickets assignment system 332 can deploy the sufficiently trained natural language processor machine learning model 334 and the machine-learning models 336-344.

The training support tickets assignment system 318 and/or the production support tickets assignment system 332 can integrate with a feedback loop, which may capture information from a user interface or an interaction layer and incorporate the captured information as inputs to the machine-learning models 320-330 and/or 334-344. The information captured is in essence the support organization management team's follow-up behavior on the estimated complexity and/or identified topic as recorded via the user interface. For example, the management team may reject an estimated complexity and/or an identified topic for a variety of reasons, and in some cases manually modify the support ticket's complexity and/or topic. Sweeping in these follow-up actions back into the machine-learning models 320-330 and/or 334-344 can enable the machine-learning models 320-330 and/or 334-344 to be re-trained in a manner that closely follows the human-decision making component, which the training support tickets assignment system 318 and/or the production support tickets assignment system 332 attempts to model. This feedback loop can enable the machine-learning models 320-330 and/or 334-344 to evolve in a personalized manner with respect to the preferences of the management team, in a way that is relevant to the team. Furthermore, the training support tickets assignment system 318 and/or the production support tickets assignment system 332 can include key metrics captured from the user interface or interaction layer, such as page share counts and number of views, in order to account for implicit complexities and/or topics from a support team's senior management personnel. This can enable the system 300 to refine the machine-learning models 320-330 and/or 334-344 over time as additional data are gathered from user interfaces about factors that may impact the complexity and/or topic beyond the immediate customer-support agent interactions in a ticketing system's support ticket itself.

When required, the machine-learning models 320-330 and/or 334-344 may be retrained to remain up to date and capture all the variations in incoming data. In addition, the system 300 can bootstrap the training of the machine-learning models 320-330 and/or 334-344. Since the machine-learning models 320-330 and/or 334-344 demonstrate portability, they may be deployed for support organizations that may be newer and have not yet gathered enough historical data to train their customized models.

The entities that the support tickets assignment systems 320 and/or 332 analyze may be relevant even beyond the support domain, because factors extracted from these entities and their evolving relationships may be used to model behavior patterns in other business workflows which operate on the assumption of the desire for continuously sustained business relationships between a customer of a product and an organization related to the product across multiple product cycles. Therefore, the use of the system 300 that determines support ticket complexities and/or topics and support agents skills and/or experiences may be emended beyond the support space to prioritize resources for responses to the communications between individuals, users, groups, teams, organizations, and businesses in spaces such as user service, sales, engineering, information technology, pharmaceutical, healthcare and medical devices industry, as well as the consumer electronics industry, which may use ticketing systems such as Jira, GitHub, ServiceNow, Salesforce, Zendesk, and Freshdesk.

The production support tickets assignment system 332 can be deployed and leveraged in a variety of different ways: The production support tickets assignment system 332 can provide recommendations for support agents to accept assignment of a given support ticket in a decentralized approach, where each support agent views a list of support ticket s they are best suited for in their own user interface, or the production support tickets assignment system 332 can directly assign support ticket s to support agents. The production support tickets assignment system 332 can provide an overview of all open support tickets. The production support tickets assignment system 332 can be deployed for tasks that use recommender systems, such as user-based filtering, and collaborative filtering.

There are a variety of key benefits associated with deploying the production support tickets assignment system 332. From a customer point of view, support ticket resolution times may be faster; escalations can reduce; sentiment scores can increase, needs attention scores may be lower, customer engagement may be higher, and some direct form of end-user rating may be higher, such as higher customer satisfaction scores. From a support organization's point of view, costs associated with escalations may be reduced, customer disengagement and churn may be reduced, costs associated with sudden collaborations/resource allocation required may be saved when support tickets stop making progress (via Pods, mentoring queue, expert queue), knowledge transfer may be facilitated (surfaces paths to support ticket resolution for similar support tickets; surfaces experts), a robust system to improve support agent skills over time may be provided, overall support efficacy may be improved, support agents may be retained for longer terms; and burnout may be prevented.

Figure 4:
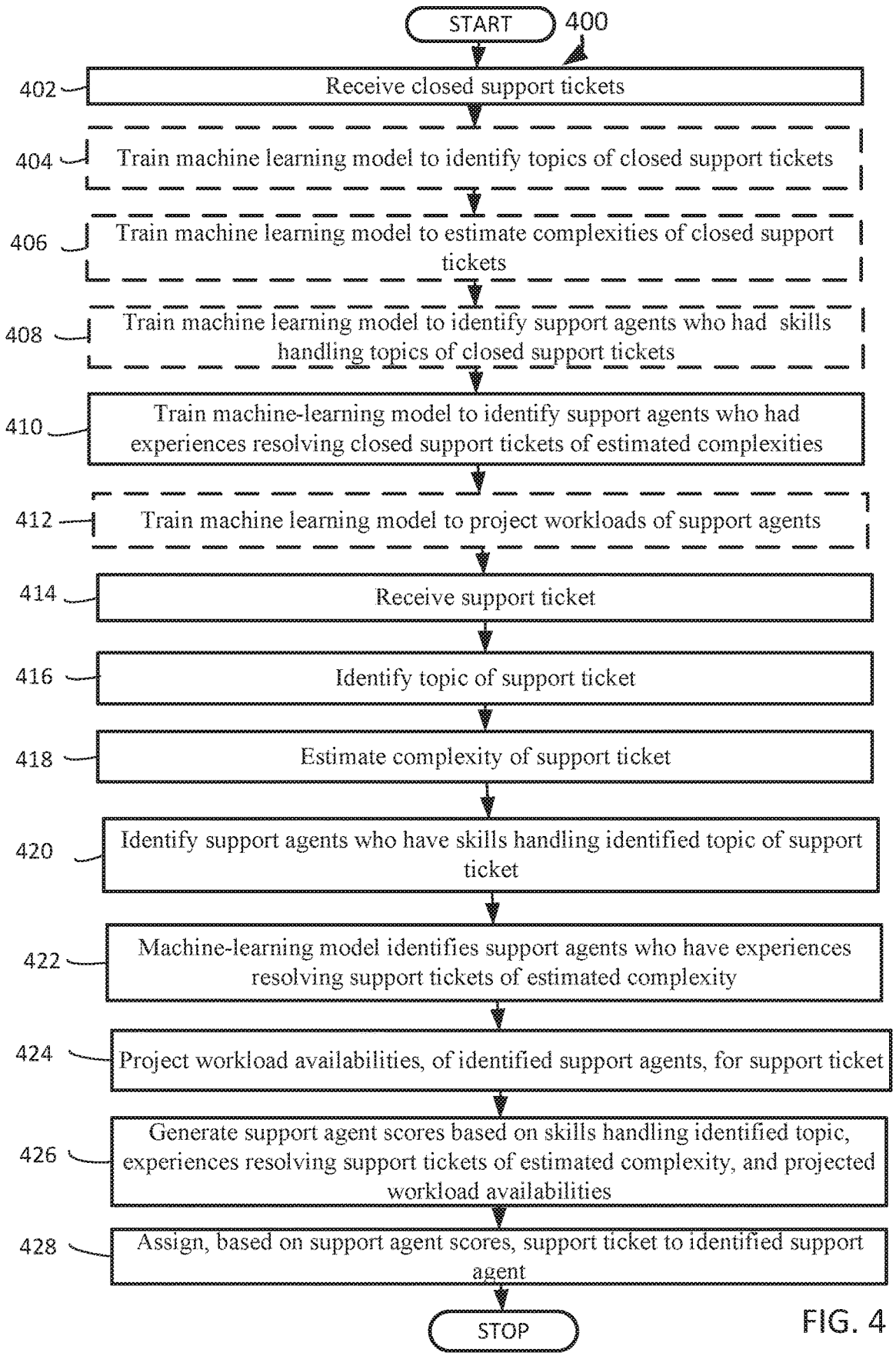
FIG. 4 is a flowchart that illustrates a computer-implemented method for assigning support tickets to support agents, under an embodiment.

FIG. 4 is a flowchart that illustrates a computer-implemented method for assigning support tickets to support agents, under an embodiment. Flowchart 400 depicts method acts illustrated as flowchart blocks for certain actions involved in and/or between the system elements 302-344 of FIG. 3.

Closed support tickets are received, block 402. The system receives a training set of closed support tickets for training machine learning models. For example, and without limitation, this can include the training support tickets assignment system 318 receiving a training set of support ticket communications, which includes the support ticket 100 that contains all subsequent communications 102 and 104 and the support ticket's metadata 106, as depicted by FIG. 1.

After receiving closed support tickets, a machine learning model is optionally trained to identify topics of the closed support tickets, block 404. The system can train to identify support tickets' topics. By way of example and without limitation, this can include the training server 312 training the support ticket topics machine-learning model 322 to use the natural language processor machine-learning model 320 to analyze the support ticket 100 and identify a remote mount problem as the topic of the support ticket 100.

Following receipt of closed support tickets, a machine learning model is optionally trained to estimate the complexities of the closed support tickets, block 406. The system can train to estimate support tickets' complexities. In embodiments, this can include the training server 312 training the support ticket complexities machine-learning model 324 to use the natural language analysis of the support ticket 100 by the natural language processor machine-learning model 320 to estimate a low complexity from the customer's description of their remote mount problem.

Having received closed support tickets, a machine learning model tis optionally trained to identify support agents who have skills handling the closed support tickets' topics, block 408. The system can train to identify agents who have skills handling support tickets' topics. For example, and without limitation, this can include the training server 312 training the support agent topical skills machine-learning model 326 to use the summary rows for the support agents in the support agent-topical skills matrix to identify Bob and Dana as support agents who had skills handling the remote mount problem of the closed support ticket 100.

Once closed support tickets are received, a machine-learning model is trained to identify support agents who have experiences resolving closed support tickets' multiple complexities, block 410. The system trains to identify support agents who have experiences resolving support tickets' complexities. By way of example and without limitation, this can include the training server 312 training the support agent complexity experiences machine-learning model 326 to use the summary rows for the support agents in the support agent-complexity experiences matrix to identify Bob and Dana as support agents who had experiences resolving support tickets that had the low complexity of the remote mount problem in the closed support ticket 100.

Subsequent to receiving closed support tickets, a machine learning model is optionally trained to project workloads of support agents, block 412. The system can train to project support agents' workloads. In embodiments, this can include the training server 312 training the support ticket projected workloads machine-learning model 328 to use the support agent-workload data structure to identify Bob and Dana as support agents who had projected workloads that would have permitted resolving low complexity support tickets such as the closed support ticket 100. The training server 312 also referenced the support agent-availability data structure to verify that Bob and Dana would have projected availabilities to be assigned the closed support ticket 100, such that Bob and Dana would have had the projected workload availability for accepting assignment of the closed support ticket 100.

Then the training support tickets assignment system 318 generated a score of 90 for assigning the closed support ticket 100 to Bob. This score of 90 was based on Bob having skills handling the remote mount problem of the closed support ticket 100, experiences resolving support tickets with the low complexity of the closed support ticket 100, a projected workload that would have permitted resolving a low complexity support ticket, and the projected availability to be assigned the closed support ticket 100. Additionally, the training support tickets assignment system 318 generated a score of 100 for assigning the closed support ticket 100 to Dana. This score of 100 was based on Dana having skills handling the remote mount problem of the closed support ticket 100, experiences resolving support tickets of low, medium, and high complexities, a projected workload that would have permitted resolving the low complexity support ticket 100, and the projected availability to be assigned the closed support ticket 100.

Although Dana's score of 100 was higher than Bob's score of 90, the training support tickets assignment system 318 assigned the closed support ticket 100 to Bob because the closed support ticket 100 was a low risk support ticket due to the few skills required to handle a remote mount problem and the low complexity of the remote mount problem described in the closed support ticket 100. Therefore, the training support tickets assignment system 318 assigned the low risk close support ticket 100 to the inexperienced support agent Bob who was sufficiently qualified to be assigned the low risk support ticket 100, while leaving Dana's workload free to handle higher risk support tickets for which Dana would have been qualified but Bob would not have been qualified.

After being trained, a support ticket is received, block 414. The system receives a support ticket for determining the support ticket's topic(s) and complexity. For example, and without limitation, this can include the production support tickets assignment system 332 receiving support tickets, which includes the support ticket 200 that contains the subsequent communication 202 and the support ticket's metadata 204, as depicted by FIG. 2.

Following the receipt of a support ticket, a topic of the support ticket is determined, block 416. The system identifies a support ticket's topic(s). By way of example and without limitation, this can include the production server 314 applying the support ticket topics machine-learning model 336 to the analysis of the support ticket 200 by the natural language processor machine-learning model 334, thereby identifying a remote mount problem as the topic of the support ticket 200.

Having received a support ticket, a complexity of the support ticket is estimated, block 418. The system estimates a support ticket's complexity. In embodiments, this can include the production server 314 applying the support ticket complexities machine-learning model 338 to the natural language analysis of the support ticket 200 by the natural language processor machine-learning model 334, thereby estimating a high complexity from the customer's description of their remote mount problem because the support ticket 200 includes multiple machine language error messages.

Subsequent to identifying a topic of a support ticket, a first set of support agents are identified who have skills handling the topic of the support ticket, block 420. The system identifies support agent who have skills to handle the support ticket's topic(s). For example, and without limitation, this can include the production server 314 applying the support agent topical skills machine-learning model 340 to the summary rows for the support agents in the support agent-topical skills matrix to identify Bob and Dana as support agents who have skills handling the remote mount problem of the open support ticket 200.

After estimating a support ticket's complexity, a machine-learning model identifies a second set of support agents who have experiences resolving support tickets of the estimated complexity, block 422. The system identifies support agents who have experiences resolving support ticket of the estimated complexity. By way of example and without limitation, this can include the production server 314 applying the support agent complexity experiences machine-learning model 340 to the summary rows for the support agents in the support agent-complexity experiences matrix to identify only Dana as a support agent who has experiences resolving support tickets that have the high complexity of the remote mount problem described in the open support ticket 200.

Following identification of support agents who can handle a support ticket's topic and resolve support tickets of the estimated complexity, workload availabilities of some of the identified support agents are projected for the support ticket, block 424. The system projects the workload availabilities of identified support agents. In embodiments, this can include the production server 312 applying the support ticket projected workloads machine-learning model 342 to the support agent-workload data structure to project the workloads of Bob and Dana, who were identified as support agents who had skills to handle remote mount problems. The production server 314 also references the support agent-availability data structure to verify that Bob and Dana will have projected availabilities to be assigned the open support ticket 200, such that Bob and Dana both have the projected workload availability for accepting assignment of the open support ticket.

Having identified available support agents, support agent scores are generated based on the support agents' skills handling the topic of the support tickets, experiences resolving support tickets of the estimated complexity, and projected workload availabilities for the support ticket, block 426. The system scores support agents for optimal assignment of a support ticket. For example, and without limitation, this can include the production support tickets assignment system 332 generating a score of 45 for assigning the open support ticket 200 to Bob. This score of 45 is based on Bob having skills handling the remote mount problem of the open support ticket 200, no experiences resolving high complexity support tickets such as the open support ticket 200, a projected workload that would have permitted resolving a high complexity support ticket, and the projected availability to be assigned the open support ticket 200. Additionally, the production support tickets assignment system 332 generates a score of 90 for assigning the open support ticket 200 to Dana. This score of 90 is based on Dana having skills handling the remote mount problem of the open support ticket 200, experiences resolving high complexity support tickets such as the open support ticket 200, a projected workload that would have permitted resolving the high complexity support ticket 200, and the projected availability to be assigned the open support ticket 200.

Subsequent to scoring support agents, the support agent scores are used to assign a support ticket to a support agent from at least one of the sets of support agents, block 428. The system optimally assigns a support ticket to a support agent. By way of example and without limitation, this can include the production support tickets assignment system 332 assigning the open support ticket 200 to Dana because Dana's score of 90 is higher than Bob's score of 45, which reflects that Dana is the only support agent who is sufficiently qualified to resolve the open support ticket 200 since Dana has the experiences which Bob lacks resolving the high complexity support tickets such as the open support ticket 200

Although FIG. 4 depicts the blocks 402-428 occurring in a specific order, the blocks 402-428 can occur in another order. In other implementations, each of the blocks 402-428 can also be executed in combination with other blocks and/or some blocks may be divided into a different set of blocks.

System Overview

Figure 5:
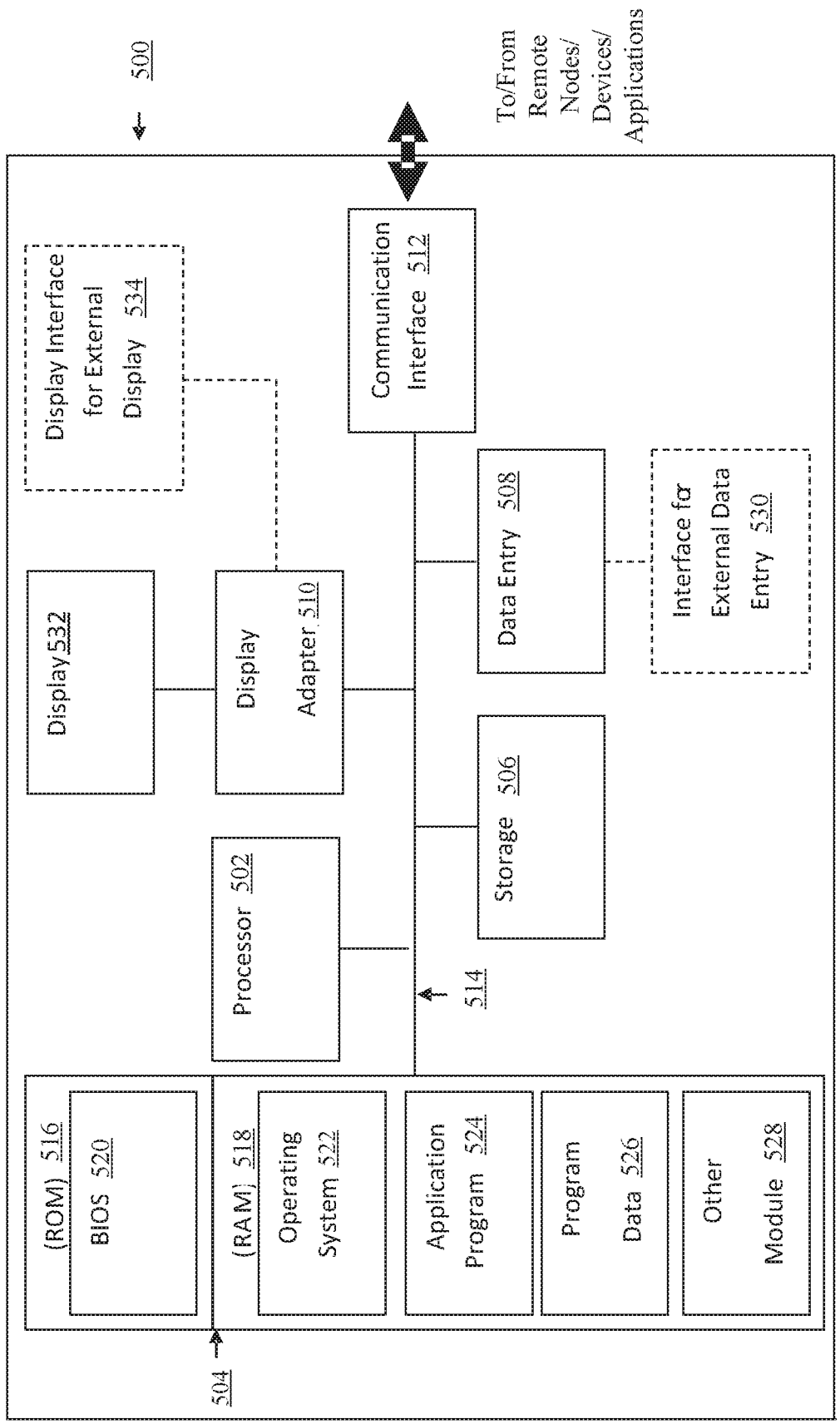
FIG. 5 is a block diagram illustrating an example hardware device in which the subject matter may be implemented.

In exemplary hardware device in which the subject matter may be implemented shall be described. Those of ordinary skill in the art will appreciate that the elements illustrated in FIG. 5 can vary depending on the system implementation. With reference to FIG. 5, an exemplary system for implementing the subject matter disclosed herein includes a hardware device 500, including a processing unit 502, a memory 504, a storage 506, a data entry module 508, a display adapter 510, a communication interface 512, and a bus 514 that couples elements 504-512 to the processing unit 502.

The bus 514 can comprise any type of bus architecture. Examples include a memory bus, a peripheral bus, a local bus, etc. The processing unit 502 is an instruction execution machine, apparatus, or device and can comprise a microprocessor, a digital signal processor, a graphics processing unit, an application specific integrated circuit (ASIC), a field programmable gate array (FPGA), etc. The processing unit 502 may be configured to execute program instructions stored in the memory 504 and/or the storage 506 and/or received via the data entry module 508.

The memory 504 can include a read only memory (ROM) 516 and a random access memory (RAM) 518. The memory 504 may be configured to store program instructions and data during operation of the hardware device 500. In various embodiments, the memory 504 can include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 504 can also include nonvolatile memory technologies such as nonvolatile flash RAM (NVRAM) or ROM. In some embodiments, it is contemplated that the memory 504 can include a combination of technologies such as the foregoing, as well as other technologies not specifically mentioned. When the subject matter is implemented in a computer system, a basic input/output system (BIOS) 520, containing the basic routines that help to transfer information between elements within the computer system, such as during start-up, is stored in the ROM 516.

The storage 506 can include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 500.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like can also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 506, the ROM 516 or the RAM 518, including an operating system 522, one or more applications programs 524, program data 526, and other program modules 528. A user can enter commands and information into the hardware device 500 through data entry module 508. The data entry module 508 can include mechanisms such as a keyboard, a touch screen, a pointing device, etc. Other external input devices (not shown) are connected to the hardware device 500 via an external data entry interface 530. By way of example and not limitation, external input devices can include a microphone, joystick, game pad, satellite dish, scanner, or the like. In some embodiments, external input devices can include video or audio input devices such as a video camera, a still camera, etc. The data entry module 508 may be configured to receive input from one or more users of the hardware device 500 and to deliver such input to the processing unit 502 and/or the memory 504 via the bus 514.

A display 532 is also connected to the bus 514 via the display adapter 510. The display 532 may be configured to display output of the hardware device 500 to one or more users. In some embodiments, a given device such as a touch screen, for example, can function as both the data entry module 508 and the display 532. External display devices can also be connected to the bus 514 via the external display interface 534. Other peripheral output devices, not shown, such as speakers and printers, may be connected to the hardware device 500.

The hardware device 500 can operate in a networked environment using logical connections to one or more remote nodes (not shown) via the communication interface 512. The remote node may be another computer, a server, a router, a peer device or other common network node, and typically includes many or all of the elements described above relative to the hardware device 500. The communication interface 512 can interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 512 can include logic configured to support direct memory access (DMA) transfers between the memory 504 and other devices.

In a networked environment, program modules depicted relative to the hardware device 500, or portions thereof, may be stored in a remote storage device, such as, for example, on a server. It will be appreciated that other hardware and/or software to establish a communications link between the hardware device 500 and other devices may be used.

It should be understood that the arrangement of the hardware device 500 illustrated in FIG. 5 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 500.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 5.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the descriptions above, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in a context, it is not meant to be limiting as those of skill in the art will appreciate that various of the acts and operations described hereinafter can also be implemented in hardware.

To facilitate an understanding of the subject matter described above, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for assigning support tickets to support agents, the system comprising:
   a computer server including a machine-learning model, an agents and topics data structure and an agents and complication level data structure, the computer server configured to:
   train the machine-learning model using a history of closed support tickets to estimate a plurality of complexities resolving closed support tickets, and identify a plurality of support agents who had a plurality of skills handling a plurality of closed support ticket topics and a plurality of experiences resolving closed support tickets of the plurality of complexities, in response to receiving the plurality of closed support tickets;
   identify a topic-of a support ticket, in response to receiving the support ticket;
   estimate, by the trained machine-learning model, one of a plurality of levels of complication of resolving the support ticket based on a body of the support ticket:
   identify, by the trained machine-learning model, a first set of support agents who have skills handling the identified topic of the support ticket, in the agents and topics data structure which retrieves any topics of support tickets and identifiers of support agents who handle the topics;
   identify, by the trained machine-learning model, a second set of support agents who have experiences resolving support tickets of the estimated level of complication, in the agents and complication levels data structure which retrieves any levels of complication for resolving support tickets and identifiers of support agents who handle the levels of complication;
   project workload availabilities, based on at least one of a time zone compatibility, a time off schedule, and active work hours associated with each support agent of at least some of the first set of support agents and the second set of support agents, for the support ticket;
   generate, by the computer server, a plurality of support agent scores based on the skills handling the identified topic-of the support ticket, the experiences resolving the support tickets of the estimated level of complication, and the projected workload availabilities for the support ticket; and
   assign, by the computer server, based on the plurality of support agent scores, the support ticket to a support agent who is identified in both the first set of support agents, identified in the agents and topics data structure, who have skills handling the identified topic of the support ticket, and the second set of support agents, identified in the agents and complication levels data structure, who have experiences resolving support tickets of the estimated level of complication, wherein the agents and topics data structure is mutually exclusive of the agents and complication levels data structure.

2. The system of claim 1, wherein the plurality of instructions further causes the processor to train another machine learning model to identify a plurality of topics of a plurality of closed support tickets, in response to receiving the plurality of closed support tickets, wherein the other machine learning model identifies the topic of the support ticket based on at least one of metadata, a body, a comment, a note, and a summary associated with the support ticket, in response to receiving the support ticket.

3. The system of claim 1, wherein the plurality of instructions further causes the processor to train another machine learning model to estimate the plurality of levels of complication of the plurality of closed support tickets, in response to receiving the plurality of closed support tickets, wherein the other machine learning model estimates one of the plurality of levels of complication of resolving the support ticket based on at least one of a body, an initial priority, a customer identity, and a customer history associated with the support ticket, in response to receiving the support ticket.

4. The system of claim 1, wherein the plurality of instructions further causes the processor to train another machine learning model to identify another plurality of support agents who had skills handling a plurality of topics of a plurality of closed support tickets, in response to receiving the plurality of closed support tickets, wherein the other machine learning model identifies the first set of support agents who have skills handling the topic of the support ticket based on at least one of a resolution time, a sentiment score, an escalation status, a support agent ticket backlog, and a support agent workload associated with each support ticket associated with the topic, in response to receiving the support ticket.

5. The system of claim 1, wherein the plurality of instructions further causes the processor to train another machine learning model to project workloads of another plurality of support agents, wherein the other machine learning model projects workload availabilities, of the at least some of the first set of support agents and the second set of support agents, for the support ticket based on at least one of a total number of support tickets currently assigned to each of the at least some of the first set of support agents and the second set of support agents, and at least one of a priority, an escalation status, a predicted probability of escalation, an estimated level of complication, and a support ticket lifestage associated with each of the total number of support tickets currently assigned to each of the at least some of the first set of support agents and the second set of support agents, in response to receiving the support ticket, the plurality of projected workload availabilities for the support ticket being based on the projected workloads.

6. The system of claim 1, wherein assigning the support ticket to the support agent comprises at least one of assigning and reassigning the support ticket to a support agent who has at least one of less skills for handling the topic of the support ticket, less experience with resolving support tickets of the of the estimated level of complication, and less projected workload availability for the support ticket, instead of to a support agent who has at least one of more skills, more experience and more projected workload availability.

7. A computer-implemented method for assigning support tickets to support agents, the computer-implemented method comprising:
   providing a computer server including a machine-learning model, an agents and topics data structure and an agents and complication levels data structure;
   training, by the computer server, using a history of closed support tickets, the machine-learning model stored on the computer server to estimate a plurality of complexities resolving closed support tickets, and identify a plurality of support agents who had a plurality of skills handling a plurality of closed support ticket topics and a plurality of experiences resolving closed support tickets of the plurality of complexities, in response to receiving the plurality of closed support tickets;
   identifying a topic of a support ticket, in response to receiving the support ticket;

estimating, by the trained machine-learning model, one of a plurality of levels of complication of resolving the support ticket based on a body of the support ticket:

identifying, by the trained machine-learning model, a first set of support agents who have skills handling the identified topic of the support ticket, in the agents and topics data structure which retrieves any topics of support tickets and identifiers of support agents who handle the topics;

identifying, by the trained machine-learning model, a second set of support agents who have experiences resolving support tickets of the estimated level of complication, in the agents and complication levels data structure which retrieves any levels of complication for resolving support tickets and identifiers of support agents who handle the levels of complication;

projecting workload availabilities, based on at least one of a time zone compatibility, a time off schedule, and active work hours associated with each support agent of at least some of the first set of support agents and the second set of support agents, for the support ticket;

generating, by the computer server, a plurality of support agent scores based on the skills handling the identified topic of the support ticket, the experiences resolving the support tickets of the estimated level of complication, and the projected workload availabilities for the support ticket; and assigning, by the computer server, based on the plurality of support agent scores, the support ticket to a support agent who is identified in both the first set of support agents, identified in the agents and topics data structure, who have skills handling the identified topic of the support ticket, and the second set of support agents, identified in the agents and complication levels data structure, who have experiences resolving support tickets of the estimated level of complication, wherein the agents and topics data structure is mutually exclusive of the agents and complication levels data structure.

8. The computer-implemented method of claim 7, wherein the computer-implemented method further comprises training another machine learning model to identify a plurality of topics of a plurality of closed support tickets, in response to receiving the plurality of closed support tickets, wherein the other machine learning model identifies the topic of the support ticket-based on at least one of metadata, a body, a comment, a note, and a summary associated with the support ticket, in response to receiving the support ticket.

9. The computer-implemented method of claim 7, wherein the computer-implemented method further comprises estimating the plurality of complexities of the plurality of closed support tickets, in response to receiving the plurality of closed support tickets, wherein the other machine learning model estimates one of a plurality of levels of complication of resolving the support ticket based on at least one of a body, an initial priority, a customer identity, and a customer history associated with the support ticket, in response to receiving the support ticket.

10. The computer-implemented method of claim 7, wherein the computer-implemented method further comprises identifying another plurality of support agents who had skills handling a plurality of-topics of a plurality of closed support tickets, in response to receiving the plurality of closed support tickets, wherein the other machine learning model identifies the first set of support agents who have skills handling the topic of the support ticket based on at least one of a resolution time, a sentiment score, an escalation status, a support agent ticket backlog, and a support agent workload associated with each support ticket associated with the topic, in response to receiving the support ticket.

11. The computer-implemented method of claim 7, wherein the computer-implemented method further comprises projecting workloads of another plurality of support agents, wherein the other machine learning model projects workload availabilities, of at least some of the first set of support agents and the second set of support agents, for the support ticket based on at least one of a total number of support tickets currently assigned to each of the at least some of the first set of support agents and the second set of support agents, and at least one of a priority, an escalation status, a predicted probability of escalation, an estimated level of complication, and a support ticket life-stage associated with each of the total number of support tickets currently assigned to each of the at least some of the first set of support agents and the second set of support agents, in response to receiving the support ticket, the plurality of projected workload availabilities for the support ticket being based on the projected workloads.

12. The computer-implemented method of claim 7, wherein assigning the support ticket to the support agent comprises at least one of assigning and reassigning the support ticket to a support agent who has at least one of less skills for handling the topic of the support ticket, less experience with resolving support tickets of the estimated level of complication, and less projected workload availability for the support ticket, instead of to a support agent who has at least one of more skills, more experience and more projected workload availability.

13. A computer program product, comprising a non-transitory computer-readable medium having a computer-readable program code embodied therein to be executed by one or more processors of a server computer, the server computer including a machine-learning model, an agents and topics data structure and an agents and complication levels data structure, the program code including instructions to:

train, by the server computer, the machine-learning model using a history of closed support tickets to estimate a plurality of complexities resolving closed support tickets, and identify a plurality of support agents who had a plurality of skills handling a plurality of closed support ticket topics and a plurality of experiences resolving closed support tickets of the plurality of complexities, in response to receiving the plurality of closed support tickets;

identify a topic of a support ticket, in response to receiving the support ticket;

estimate, by the trained machine-learning model, one of a plurality of levels of complication of resolving the support ticket based on a body of the support ticket:

identify, by the trained machine-learning model, a first set of support agents who have skills handling the identified topic of the support ticket, in the agents and topics data structure which retrieves any topics of support tickets and identifiers of support agents who handle the topics;

identify, by the trained machine-learning model, a second set of support agents who have experiences resolving support tickets of the estimated level of complication, in the agents and complication levels data structure which retrieves any levels of complication for resolving support tickets and identifiers of support agents who handle the levels of complication;

project workload availabilities, based on at least one of a time zone compatibility, a time off schedule, and active work hours associated with each support agent of at least some of the first set of support agents and the second set of support agents, for the support ticket;

generate, by the server computer, a plurality of support agent scores based on the skills handling the identified topic of the support ticket, the experiences resolving the support tickets of the estimated level of complication, and the projected workload availabilities for the support ticket; and assign, by the server computer, based on the plurality of support agent scores, the support ticket to a support agent who is identified in both the first set of support agents, identified in the agents and topics data structure, who have skills handling the identified topic of the support ticket, and the second set of support agents, identified in the agents and complication levels data structure, who have experiences resolving support tickets of the estimated level of complication, wherein the agents and topics data structure is mutually exclusive of the agents and complication levels data structure.

14. The computer program product of claim 13, wherein the program code includes further instructions to identify a plurality of topics of the plurality of closed support tickets, in response to receiving the plurality of closed support tickets, wherein the other machine learning model identifies the topic of the support ticket based on at least one of metadata, a body, a comment, a note, and a summary associated with the support ticket, in response to receiving the support ticket.

15. The computer program product of claim 13, wherein the program code includes further instructions to estimate the plurality of complexities of the plurality of closed support tickets, in response to receiving the plurality of closed support tickets, wherein the other machine learning model estimates one of a plurality of levels of complication for resolving the support ticket based on at least one of a body, an initial priority, a customer identity, and a customer history associated with the support ticket, in response to receiving the support ticket.

16. The computer program product of claim 13, wherein the program code includes further instructions to identify another plurality of support agents who had skills handling a plurality of topics-of a plurality of closed support tickets, in response to receiving the plurality of closed support tickets, wherein the other machine learning model identifies the first set of support agents who have skills handling the topic of the support ticket based on at least one of a resolution time, a sentiment score, an escalation status, a support agent ticket backlog, and a support agent workload associated with each support ticket associated with the topic, in response to receiving the support ticket.

17. The computer program product of claim 13, wherein the program code includes further instructions to project workloads of another plurality of support agents, wherein the other machine learning model projects workload availabilities, of the at least some of the first set of support agents and the second set of support agents, for the support ticket based on at least one of a total number of support tickets currently assigned to each of the at least some of the first set of support agents and the second set of support agents, and at least one of a priority, an escalation status, a predicted probability of escalation, an estimated level of complication, and a support ticket life-stage associated with each of the total number of support tickets currently assigned to each of the at least some of the first set of support agents and the second set of support agents, in response to receiving the support ticket, the plurality of projected workload availabilities for the support ticket being based on the projected workloads.

18. The computer program product of claim 13, wherein assigning the support ticket to the support agent comprises at least one of assigning and reassigning the support ticket to a support agent who has at least one of less skills for handling the topic of the support ticket, less experience with resolving support tickets of the estimated of the estimated level of complication, and less projected workload availability for the support ticket, instead of to a support agent who has at least one of more skills, more experience and more projected workload availability.

\* \* \* \* \*